United States Patent
Hanauer et al.

(10) Patent No.: US 9,904,417 B2
(45) Date of Patent: Feb. 27, 2018

(54) PROJECTED CAPACITIVE TOUCH DETECTION WITH TOUCH FORCE DETECTION USING SELF-CAPACITANCE AND MUTUAL CAPACITANCE DETECTION

(71) Applicant: Microchip Technology Incorporated, Chandler, AZ (US)

(72) Inventors: Jerry Hanauer, Germantown, WI (US); Keith E. Curtis, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 147 days.

(21) Appl. No.: 14/254,407

(22) Filed: Apr. 16, 2014

(65) Prior Publication Data

US 2015/0301642 A1    Oct. 22, 2015

(51) Int. Cl.
  *G06F 3/044*    (2006.01)
  *G06F 3/041*    (2006.01)
(52) U.S. Cl.
  CPC ............ *G06F 3/044* (2013.01); *G06F 3/0414* (2013.01); *G06F 3/0416* (2013.01); *G06F 2203/04106* (2013.01); *G06F 2203/04111* (2013.01)
(58) Field of Classification Search
  None
  See application file for complete search history.

(56) References Cited

U.S. PATENT DOCUMENTS

| | | | |
|---|---|---|---|
| 7,460,441 B2 | 12/2008 | Bartling | 368/118 |
| 7,764,213 B2 | 7/2010 | Bartling | 341/152 |
| 2006/0197753 A1* | 9/2006 | Hotelling | G06F 1/1626 345/173 |
| 2007/0229475 A1 | 10/2007 | Gettemy et al. | 345/173 |
| 2010/0181180 A1 | 7/2010 | Peter | 200/5 R |
| 2011/0057899 A1* | 3/2011 | Sleeman | G01L 1/146 345/174 |

(Continued)

FOREIGN PATENT DOCUMENTS

| | | | | |
|---|---|---|---|---|
| CN | 103593100 A | 2/2014 | | G06F 3/044 |
| WO | 2011/137200 A1 | 11/2011 | | G06F 3/044 |

OTHER PUBLICATIONS

International Search Report and Written Opinion, Application No. PCT/US2015/025767, 14 pages, dated Jun. 18, 2015.

(Continued)

*Primary Examiner* — Ryan A Lubit
(74) *Attorney, Agent, or Firm* — Slayden Grubert Beard PLLC

(57) ABSTRACT

A force sensing touch sensor comprises a substrate having a plurality of conductive electrode rows and a plurality of conductive electrode columns substantially perpendicular to and over the plurality of conductive electrode rows on a surface of the substrate, and a force sensor at each corner of the substrate. When a touch is applied to the surface of the touch sensor, the capacitance value will change of a capacitor formed by an intersection of an electrode row and column proximate to the location of the touch to the surface of the touch sensor. These force sensors detect total and proportional force on the touch sensor substrate. This force information is then combined with the touch location(s) previously determined, and the individual touch force(s) can then be interpolated with sufficient resolution for three dimensional (3D) gesturing applications.

28 Claims, 19 Drawing Sheets

(56) References Cited

U.S. PATENT DOCUMENTS

| | | | |
|---|---|---|---|
| 2012/0075214 A1 | 3/2012 | Kim | 345/173 |
| 2012/0113047 A1 | 5/2012 | Hanauer et al. | 345/174 |
| 2012/0217147 A1* | 8/2012 | Porter | H03K 17/962 200/600 |
| 2013/0147739 A1 | 6/2013 | Aberg et al. | 345/173 |
| 2014/0028575 A1* | 1/2014 | Parivar | G06F 3/0414 345/173 |
| 2014/0197018 A1* | 7/2014 | Chen | G06F 3/044 200/600 |
| 2014/0347315 A1 | 11/2014 | Mo et al. | 345/174 |
| 2014/0368460 A1* | 12/2014 | Mo | G06F 3/0416 345/174 |

OTHER PUBLICATIONS

Skanda, Vinaya, "AN1208: Integrated Power Factor Correction (PFC) and Sensorless Field Oriented Control (FOC) System," Microchip Technology Incorporated, 22 pages, Jan. 2, 2008.

Bohn, Bruce, "AN1250: Microchip CTMU for Capacitive Touch Applications," Microchip Technology Incorporated, 22 pages, Jan. 16, 2009.

Perme, Thomas et al., "AN1298: Capacitive Touch Using Only an ADC ("CVD")," Microchip Technology Incorporated, 4 pages, Mar. 26, 2009.

Curtis, Keith et al., "AN1325: mTouch™ Metal Over Cap Technology," Microchip Technology Incorporated, 8 pages, Jan. 5, 2010.

Davison, Burke, "AN1334: Techniques for Robust Touch Sensing Design," Microchip Technology Incorporated, 28 pages, Jul. 15, 2010.

O'Connor, Todd, "TB3064: mTouch™ Projected Capacitive Touch Screen Sensing Theory of Operation," Microchip Technology Incorporated, 16 pages, Aug. 24, 2010.

Yedamale, Padmaraja et al., "AN1375: See What You Can Do with the CTMU," Microchip Technology Incorporated, 12 pages, Feb. 18, 2011.

* cited by examiner

PROJECTED CAPACITIVE TOUCH DETECTION WITH TOUCH FORCE DETECTION USING SELF-CAPACITANCE AND MUTUAL CAPACITANCE DETECTION

TECHNICAL FIELD

The present disclosure relates to touch sensors, and, more particularly, to a touch sensor that senses both touch location(s) and pressure (force) applied at the touch sensor during a touch(es) and/or gesturing.

BACKGROUND

Touch sensors comprising a touch detecting substrate having an area generally can only determine a location(es) of a touch(es) to a surface of the substrate area, e.g., two dimensional X-Y coordinates. A third sense input is desired to allow for additional information that may be used in combination with the X-Y touch location inputs. Being able to determine not only the X-Y coordinate location of a touch but also the force of the touch to the surface of the touch sensor substrate gives another control option that may be used with a device having a touch sensor with such features.

SUMMARY

Therefore, a need exists for a touch sensor that may be used to detect both a location(s) of a touch(es) thereto and a force(s) thereon.

According to an embodiment, an apparatus for determining a location of a touch thereto and a force thereof on a touch sensing surface may comprise: a first plurality of electrodes arranged in a parallel orientation having a first axis, wherein each of the first plurality of electrodes may comprise a self capacitance; a second plurality of electrodes arranged in a parallel orientation having a second axis substantially perpendicular to the first axis, the first plurality of electrodes may be located over the second plurality of electrodes and form a plurality of nodes may comprise overlapping intersections of the first and second plurality of electrodes, wherein each of the plurality of nodes may comprise a mutual capacitance; a substrate having the first and second plurality of electrodes disposed thereon, wherein the substrate may have a plurality of corners; and a plurality of force sensors, wherein each corner of the substrate may be coupled to a respective one of the plurality of force sensors; whereby each of the plurality of force sensors measures a portion of a force applied to the substrate during a touch thereto.

According to a further embodiment, the substrate may be substantially light transmissive and the first and second plurality of electrodes may comprise Indium Tin Oxide (ITO). According to a further embodiment, the substrate may be substantially light transmissive and the first and second plurality of electrodes may comprise Antimony Tin Oxide (ATO). According to a further embodiment, the substrate may comprise four corners.

According to another embodiment, a method for determining a location of a touch thereto and a force thereof on a touch sensing surface may comprise the steps of: providing a first plurality of electrodes arranged in a parallel orientation having a first axis, wherein each of the first plurality of electrodes may comprise a self capacitance; providing a second plurality of electrodes arranged in a parallel orientation having a second axis substantially perpendicular to the first axis, the first plurality of electrodes may be located over the second plurality of electrodes and form a plurality of nodes may comprise overlapping intersections of the first and second plurality of electrodes, wherein each of the plurality of nodes may comprise a mutual capacitance; providing a substrate having the first and second plurality of electrodes disposed thereon, wherein the substrate may have a plurality of corners; providing a plurality of force sensors, wherein each corner of the substrate may be coupled to a respective one of the plurality of force sensors; scanning the first plurality of electrodes for determining values of the self capacitances thereof; comparing the values of the scanned self capacitances to determine which one of the first plurality of electrodes may have the largest value of self capacitance; scanning the nodes of the one of the first plurality of electrodes having the largest value of self capacitance for determining values of the mutual capacitances of the respective plurality of nodes; comparing the values of the scanned mutual capacitances of the respective plurality of nodes on the first electrode having the largest value of self capacitance, wherein the node having the largest value of mutual capacitance may be a location of a touch on the touch sensing surface; and determining a force of the touch on the touch sensing surface from force values measured by the plurality of force sensors.

According to a further embodiment of the method, the self and mutual capacitance values may be measured with an analog front end and an analog-to-digital converter (ADC). According to a further embodiment of the method, the self and mutual capacitance values may be stored in a memory of a digital device. According to a further embodiment of the method, a digital processor in the digital device may use the stored self and mutual capacitance values in determining the touch location of the touch and the force applied by the touch to the touch sensing surface at the touch location. According to a further embodiment of the method, the step of determining a force of the touch on the touch sensing surface may comprise the step of determining a calculated force point (CFP) by adding together the force values measured by the plurality of force sensors.

According to yet another embodiment, a method for determining locations of a plurality of touches thereto and a combined force thereof on a touch sensing surface may comprise the steps of: providing a first plurality of electrodes arranged in a parallel orientation having a first axis, wherein each of the first plurality of electrodes may comprise a self capacitance; providing a second plurality of electrodes arranged in a parallel orientation having a second axis substantially perpendicular to the first axis, the first plurality of electrodes may be located over the second plurality of electrodes and form a plurality of nodes may comprise overlapping intersections of the first and second plurality of electrodes, wherein each of the plurality of nodes may comprise a mutual capacitance; providing a substrate having the first and second plurality of electrodes disposed thereon, wherein the substrate may have a plurality of corners; providing a plurality of force sensors, wherein each corner of the substrate may be coupled to a respective one of the plurality of force sensors; scanning the first plurality of electrodes for determining values of the self capacitances thereof; comparing the values of the scanned self capacitances to determine which ones of the first plurality of electrodes may have the largest values of self capacitance; scanning the nodes of the ones of the first plurality of electrodes having the largest values of self capacitance for determining values of the mutual capacitances of the respective plurality of nodes; comparing the values of the scanned mutual capacitances of the respective plurality of nodes on the first electrodes having the largest values of self capacitance, wherein the nodes having the largest values of mutual capacitance may be locations of touches on the touch sensing surface; and determining a combined force of the touches on the touch sensing surface from force values measured by the plurality of force sensors.

According to a further embodiment of the method, the self and mutual capacitance values may be measured with an analog front end and an analog-to-digital converter (ADC). According to a further embodiment of the method, the self and mutual capacitance values may be stored in a memory of a digital device. According to a further embodiment of the method, a digital processor in the digital device may use the stored self and mutual capacitance values in determining the touch locations of the touches and the respective forces applied by the touches to the touch sensing surface at the touch locations.

According to a further embodiment of the method, the step of determining a combined force of the touches on the touch sensing surface may comprise the steps of: determining a calculated force point (CFP) by adding together the force values measured by the plurality of force sensors; and determining a center of mass (CM) by using the touch locations and the force values measured by the plurality of force sensors.

According to a further embodiment of the method, the step of determining the CM may comprise the steps of: determining an X-offset, $X_R$, of the CFP; and determining a Y-offset, $Y_R$, of the CFP. According to a further embodiment of the method, the step of determining the X-offset, $X_R$, may comprise the step of solving $X_R=(((F1+F3)*(-W/2))+((F2+F4)*(W/2))/F_R$, wherein W may be a width of a face of the touch sensing surface, and $X_R$ may be an X offset from the CM to the CFP. According to a further embodiment of the method, the step of determining the Y-offset, $Y_R$, may comprise the step of solving $Y_R=(((F1+F2)*(-H/2))+((F3+F4)*(H/2))/F_R$, wherein H may be a height of a face of the touch sensing surface, and $Y_R$ may be a Y offset from the CM to the CFP.

According to still another embodiment, a system for determining locations of touches thereto and a combined force thereof on a touch sensing surface may comprise: a first plurality of electrodes arranged in a parallel orientation having a first axis, wherein each of the first plurality of electrodes may comprise a self capacitance; a second plurality of electrodes arranged in a parallel orientation having a second axis substantially perpendicular to the first axis, the first plurality of electrodes may be located over the second plurality of electrodes and form a plurality of nodes may comprise overlapping intersections of the first and second plurality of electrodes, wherein each of the plurality of nodes may comprise a mutual capacitance; a substrate having the first and second plurality of electrodes disposed thereon, wherein the substrate may have a plurality of corners; a plurality of force sensors, wherein each corner of the substrate may be coupled to a respective one of the plurality of force sensors; a digital processor and memory, wherein digital outputs of the digital processor may be coupled to the first and second plurality of electrodes; an analog front end coupled to the first and second plurality of electrodes and the plurality of force sensors; an analog-to-digital converter (ADC) having at least one digital output coupled to the digital processor; wherein values of the self capacitances may be measured for each of the first plurality of electrodes by the analog front end, the values of the measured self capacitances may be stored in the memory; values of the mutual capacitances of the nodes of at least one of the first electrodes having at least one of the largest values of self capacitance may be measured by the analog front end, the values of the measured mutual capacitances may be stored in the memory; values of forces measured by the plurality of force sensors may be stored in the memory; and the digital processor may use the stored self and mutual capacitance values for determining locations of the touches, and calculating a force point (CFP) and a center of mass (CM) on the touch sensing surface from the force values measured by the plurality of force sensors.

According to a further embodiment, the digital processor, memory, analog front end and ADC may be provided by a digital device. According to a further embodiment, the digital processor, memory, analog front end and ADC may be provided by at least one digital device. According to a further embodiment, the digital device may comprise a microcontroller. According to a further embodiment, the digital device may be selected from the group consisting of a microprocessor, a digital signal processor, an application specific integrated circuit (ASIC) and a programmable logic array (PLA).

According to a further embodiment, the substrate may be substantially light transmissive and the first and second plurality of electrodes may comprise Indium Tin Oxide (ITO). According to a further embodiment, the substrate may be substantially light transmissive and the first and second plurality of electrodes may comprise Antimony Tin Oxide (ATO). According to a further embodiment, the substrate may comprise four corners.

BRIEF DESCRIPTION OF THE DRAWINGS

A more complete understanding of the present disclosure may be acquired by referring to the following description taken in conjunction with the accompanying drawings wherein.

Figure 1:
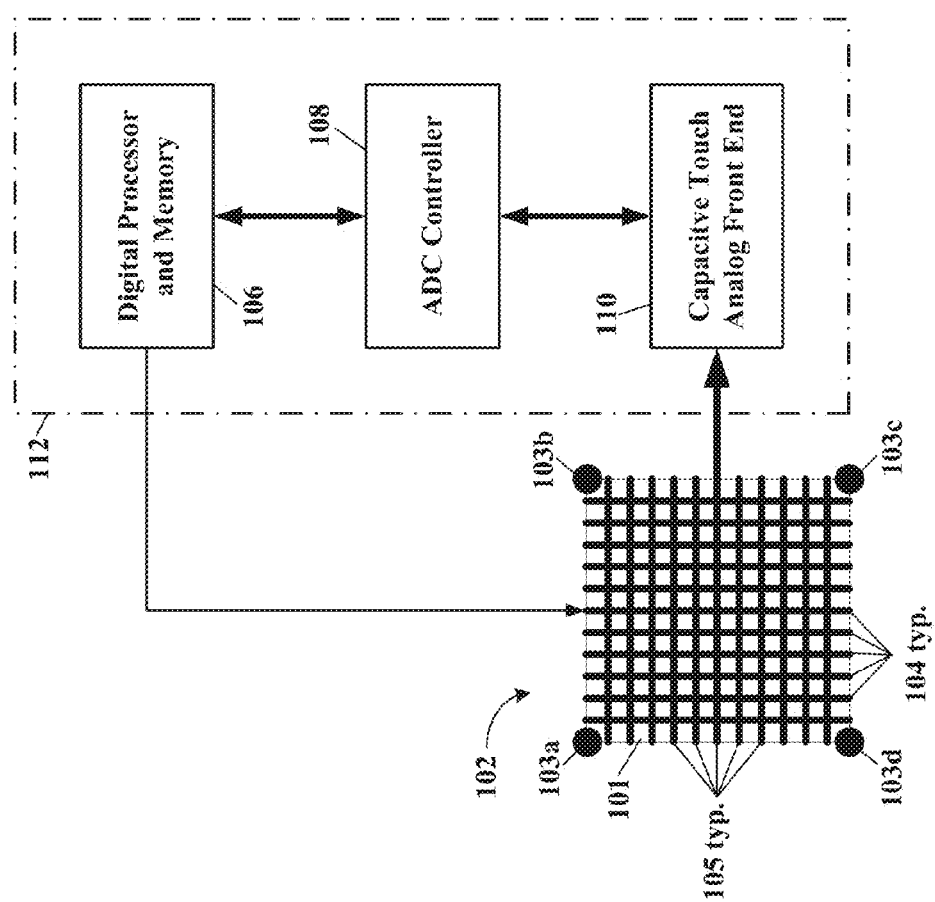
FIG. 1 illustrates a schematic block diagram of an electronic system having a capacitive touch and force sensor, a capacitive touch analog front end and a digital processor, according to an embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments, a touch sensor may comprise a substrate having a plurality of conductive electrode rows and a plurality of conductive electrode columns substantially perpendicular to and over the plurality of conductive electrode rows on a surface of the substrate, and a force or pressure sensor at each corner of the substrate. The terms "force" and "pressure" will be used interchangeable herein. When a touch is applied to the surface of the touch sensor, the capacitance value will change of a capacitor formed by an intersection of an electrode row and column proximate to the location of the touch to the surface of the touch sensor. This method of determining touches to the surface of a touch sensor is call "Projected Capacitive (PCAP) Touch" and is more fully described in Technical Bulletin TB3064, entitled "mTouch™ Projected Capacitive Touch Screen Sensing Theory of Operation" by Todd O'Connor, available at www.microchip.com; and commonly owned United States Patent Application Publication No. US 2012/0113047, entitled "Capacitive Touch System Using Both Self and Mutual Capacitance" by Jerry Hanauer; wherein both are hereby incorporated by reference herein for all purposes. The touch sensor may be incorporated into a touch screen display used in smart phones, tablet computers, computer displays, automobile, airplane and boat information and control displays; etc.

A force or pressure sensor may be located at each corners of a touch sensor substrate. These force sensors detect total and proportional force on the touch sensor substrate. This force information is then combined with the touch location(s) previously determined, and the individual touch force(s) can then be interpolated with sufficient resolution for three dimensional (3D) gesturing applications. For example for a square or rectangular touch sensor substrate whenever there is one or more touches made to the surface of the touch sensor substrate, forces are applied to four force sensors, one force sensor located at each corner of the substrate. The force at each force sensor is dependent upon the location(s) on surface of the touch sensor of the one or more touches. When a single touch is applied to the surface of the touch sensor force information from the four touch sensors may be used to determine the force of the single touch. When two touches are applied to the surface of the touch sensor substrate force information from the four touch sensors may be used to interpolate the forces applied based upon the known positions of the two touches. When three or more touches are applied to the surface of the touch sensor substrate force information from the four touch sensors may be used to determine pressure biases between the touch locations.

The resulting force information from the one or more touches may be used to determine and utilize a third dimension of information that can be advantageously used to provide information and features for three dimensional (3D) gesture recognition using only a two dimension touch screen or panel in combination with the four touch sensors, one at each corner of the touch screen or panel. This allows an increase in the bandwidth, complexity and functionality of gesture commands on touch screens or panels without impacting visual clarity of the display portion of the touch screens or panels.

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of an electronic system having a capacitive touch sensor, a capacitive touch analog front end and a digital processor, according to the teachings of this disclosure. A digital device 112 may comprise a digital processor and memory 106, an analog-to-digital converter (ADC) controller 108, and a capacitive touch analog front end (AFE) 110. The digital device 112 may be coupled to a touch sensor 102 comprised of a substrate 101 having a plurality of conductive columns 104 and rows 105 arranged in a matrix thereon, and four force sensors 103, one sensor 103 at each corner of the substrate 101. It is contemplated and within the scope of this disclosure that the conductive rows 105 and/or conductive columns 104 may be, for example but are not limited to, printed circuit board conductors, wires, Indium Tin Oxide (ITO), Antimony Tin Oxide (ATO) coatings on a clear substrate, e.g., display/touch screen, etc., or any combinations thereof. The digital device 112 may comprise a microcontroller, microprocessor, digital signal processor, application specific integrated circuit (ASIC), programmable logic array (PLA), etc.; and may further comprise one or more integrated circuits (not shown), packaged or unpackaged.

Figure 2A:
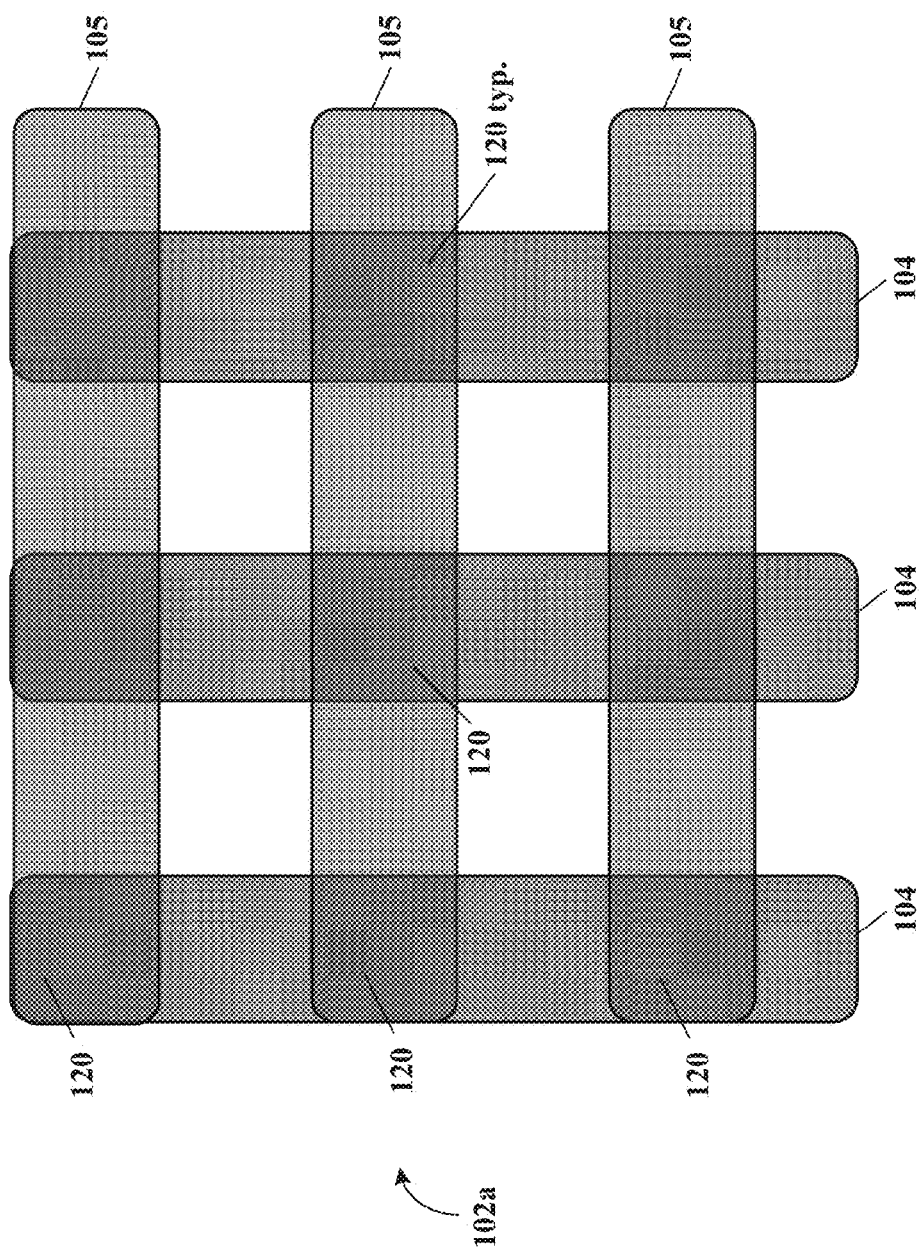
FIGS. 2A to 2D illustrate schematic plan views of touch sensors having various capacitive touch sensor configurations, according to the teachings of this disclosure.

Referring to FIGS. 2A to 2D, depicted are schematic plan views of touch sensors having various capacitive touch sensor configurations, according to the teachings of this disclosure. FIG. 2A shows conductive columns 104 and conductive rows 105. Each of the conductive columns 104 has a "self capacitance" that may be individually measured when in a quiescent state, or all of the conductive rows 105 may be actively excited while each one of the conductive columns 104 has self capacitance measurements made thereof. Active excitation of all of the conductive rows 105 may provide a stronger measurement signal for individual capacitive measurements of the conductive columns 104.

For example, if there is a touch detected on one of the conductive columns 104 during a self capacitance scan, then only that conductive column 104 having the touch detected thereon need be measured further during a mutual capacitance scan thereof. The self capacitance scan can only determine which one of the conductive columns 104 has been touched, but not at what location along the axis of that conductive column 104 where it was touched. The mutual capacitance scan may determine the touch location along the axis of that conductive column 104 by individually exciting (driving) one at a time the conductive rows 105 and measuring a mutual capacitance value for each one of the locations on that conductive column 104 that intersects (crosses over) the conductive rows 105. There may be an insulating non-conductive dielectric (not shown) between and separating the conductive columns 104 and the conductive rows 105. Where the conductive columns 104 intersect with (crossover) the conductive rows 105, mutual capacitors 120 are thereby formed. During the self capacitance scan above, all of the conductive rows 105 may be either grounded, e.g., $V_{SS}$, or driven to a voltage, e.g., $V_{DD}$, with a logic signal; thereby forming individual column capacitors associated with each one of the conductive columns 104.

Figure 2B:
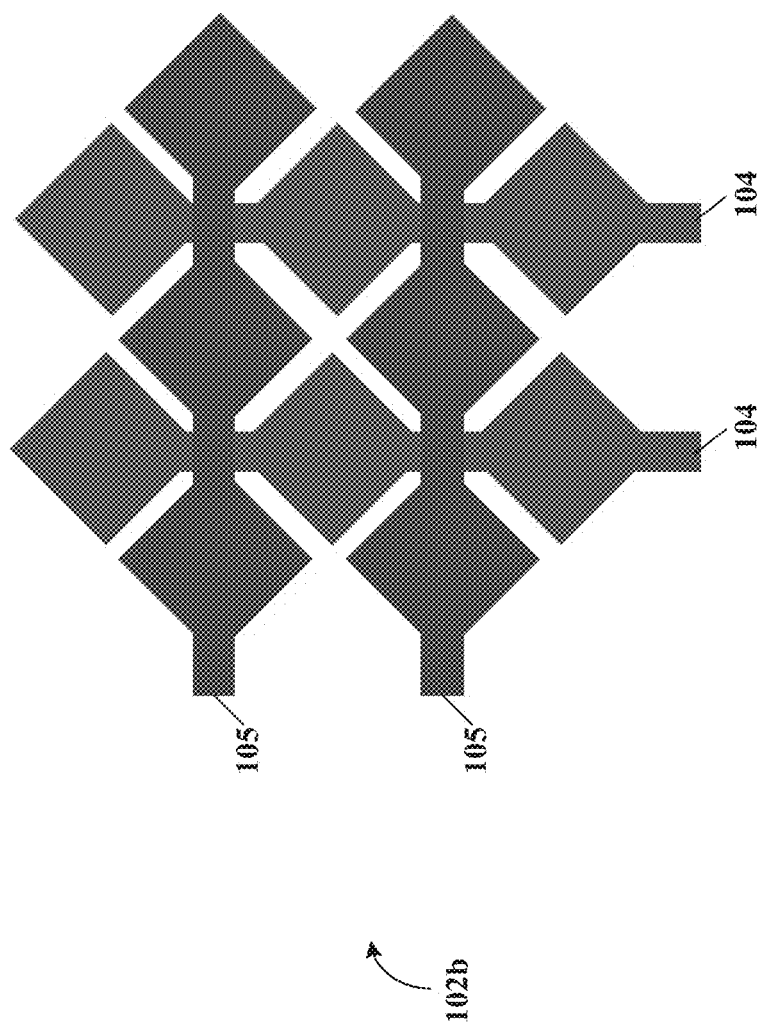
Figure 2C:
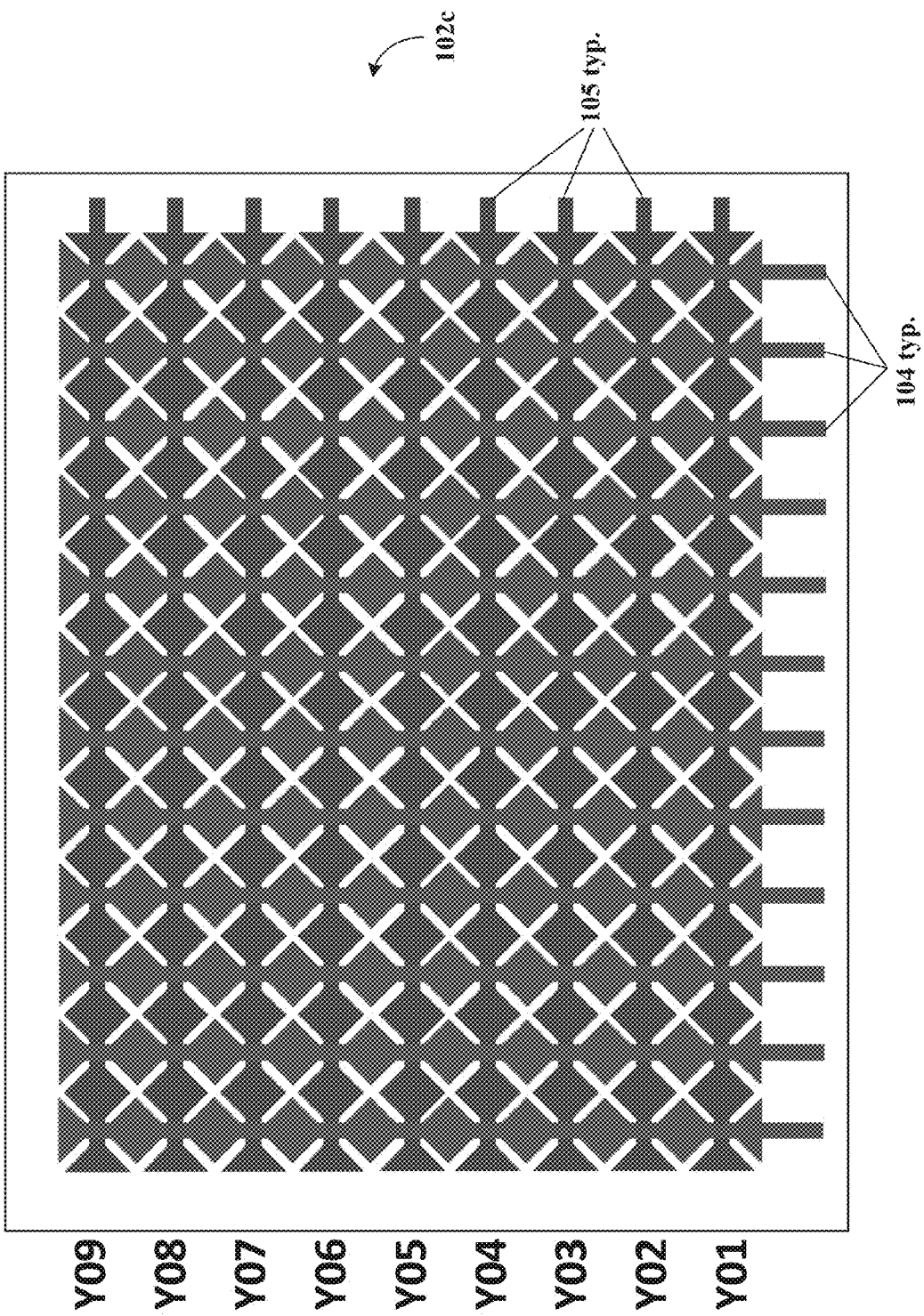
Figure 2D:
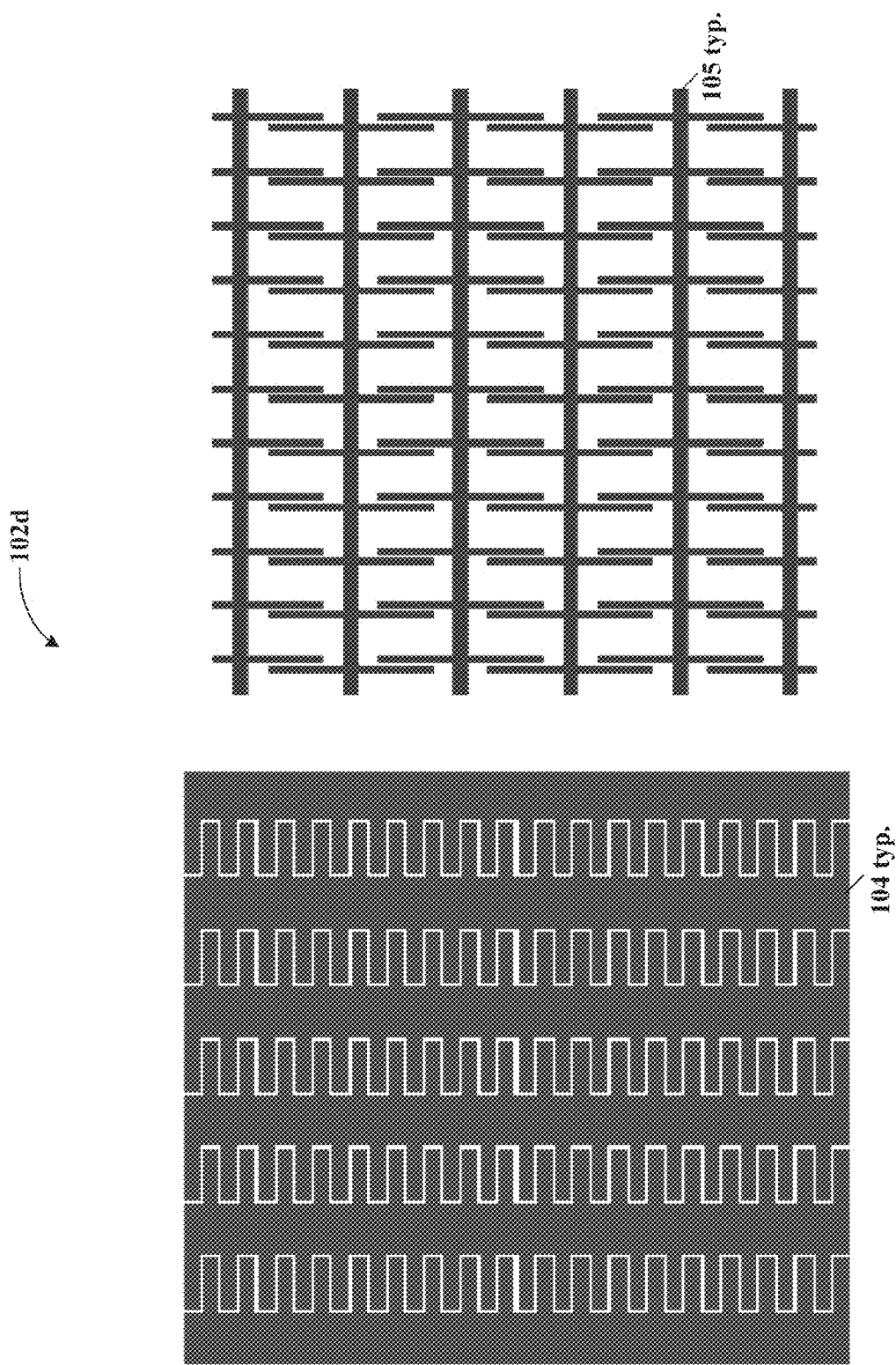

FIGS. 2B and 2C show interleaving of diamond shaped patterns of the conductive columns 104 and the conductive rows 105. This configuration may maximize exposure of each axis conductive column and/or row to a touch (e.g., better sensitivity) with a smaller overlap between the conductive columns 104 and the conductive rows 105. FIG. 1D shows receiver (top) conductive rows (e.g., electrodes) 105a and transmitter (bottom) conductive columns 104a comprising comb like meshing fingers. The conductive columns 104a and conductive rows 105a are shown in a side-by-side plan view, but normally the top conductive rows 105a would be over the bottom conductive columns 104a.

Figure 3:
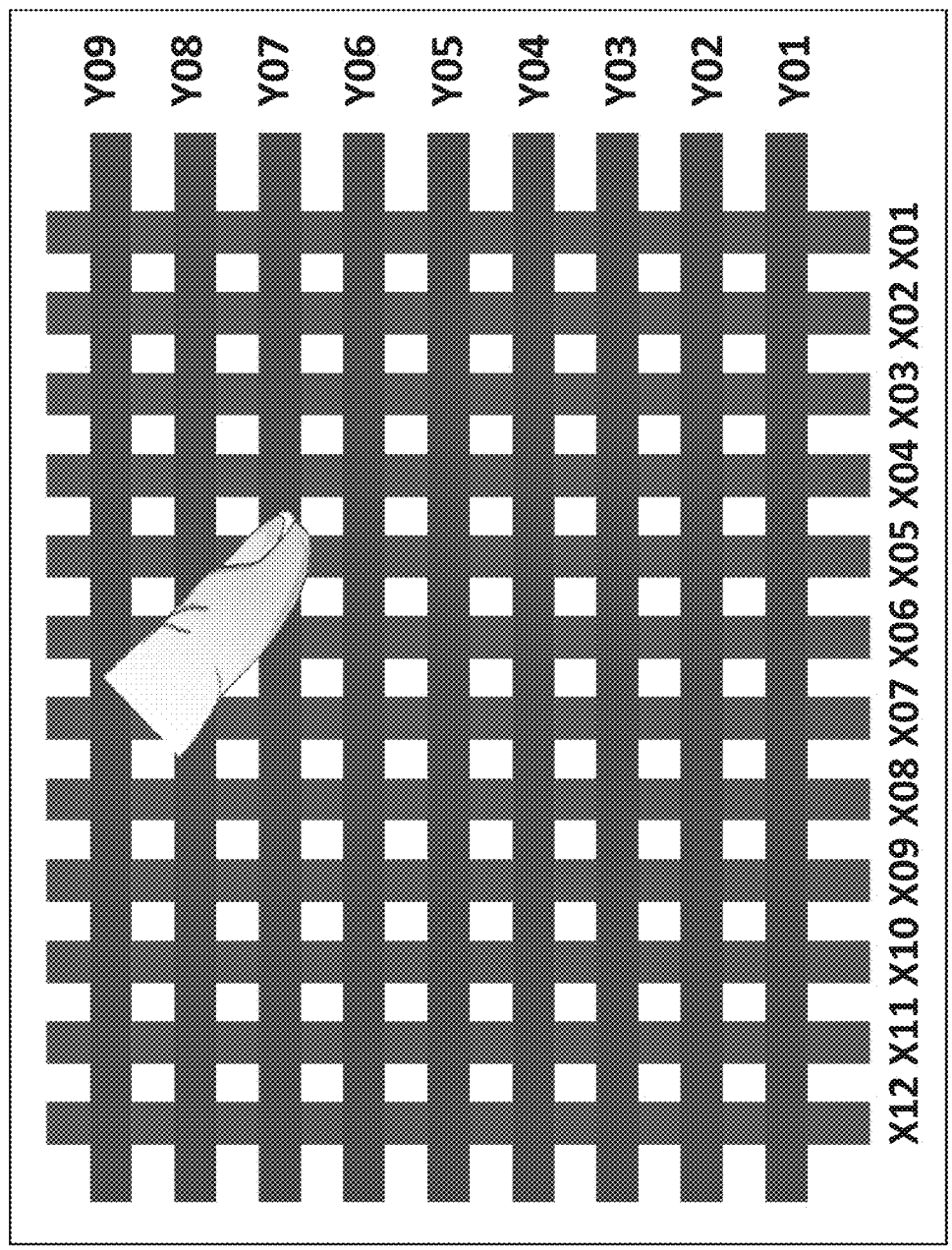
FIGS. 3 and 4 illustrate schematic plan views of self and mutual capacitive touch detection of a single touch to a touch sensor, according to the teachings of this disclosure.
Figure 4:
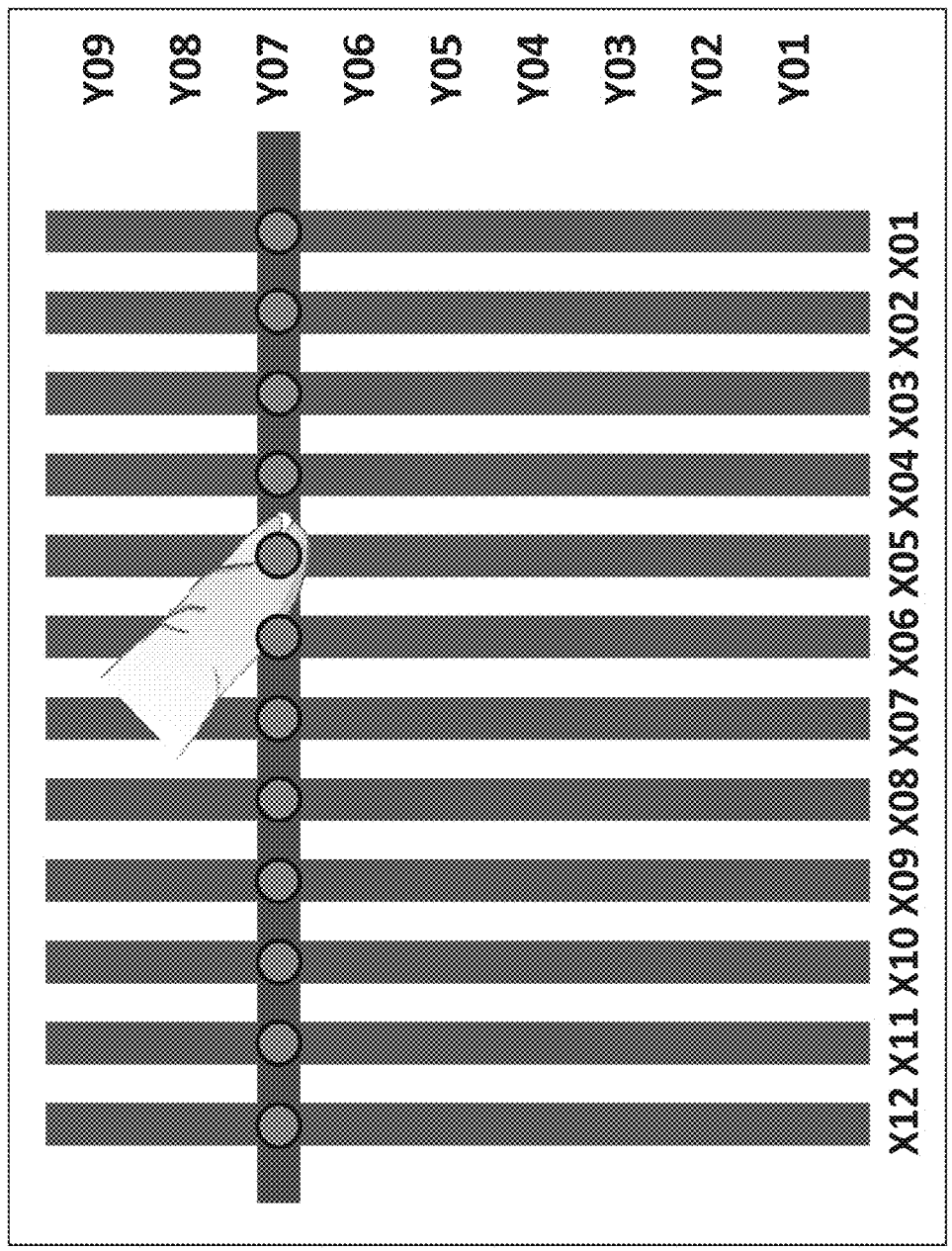

Referring to FIGS. 3 and 4, depicted are schematic plan views of self and mutual capacitive touch detection of a single touch to a touch sensor, according to the teachings of this disclosure. In FIG. 3 a touch, represented by a picture of a part of a finger, is at approximately the coordinates of X05, Y07. During self capacitive touch detection each one of the rows Y01 to Y09 may be measured to determine the capacitance values thereof. Note that baseline capacitance values with no touches thereto for each one of the rows Y01 to Y09 have been taken and stored in a memory (e.g., memory 106—FIG. 1). Any significant capacitance change to the baseline capacitance values of the rows Y01 to Y09 will be obvious and taken as a finger touch. In the example shown in FIG. 3 the finger is touching row Y07 and the capacitance value of that row will change, indicating a touch thereto. However it is still unknown from the self capacitance measurements where on this row that the touch has occurred.

Once the touched row (Y07) has been determined using the self capacitance change thereof, mutual capacitive detection may be used in determining where on the touched row (Y07) the touch has occurred. This may be accomplished by exciting, e.g., putting a voltage pulse on, each of the columns X01 to X12 one at a time while measuring the capacitance value of row Y07 when each of the columns X01 to X12 is individually excited. The column (X05) excitation that causes the largest change in the capacitance value of row Y07 will be the location on that row which corresponds to the intersection of column X05 with row Y07, thus the single touch is at point or node X05, Y07. Using self and mutual capacitance touch detection significantly reduces the number of row and column scans to obtain the X,Y touch coordinate on the touch sensor 102. In this example, nine (9) rows were scanned during self capacitive touch detection and twelve (12) columns were scanned during mutual capacitive touch detection for a total number of 9+12=21 scans. If individual x-y capacitive touch sensors for each node (location) were used then 9×12=108 scans would be necessary to find this one touch, a significant difference. It is contemplated and within the scope of this disclosure that the self capacitances of the columns X01 to X21 may be determined first then mutual capacitances determined of a selected column(s) by exciting each row Y01 to Y09 to find the touch location on the selected column(s).

Figure 5:
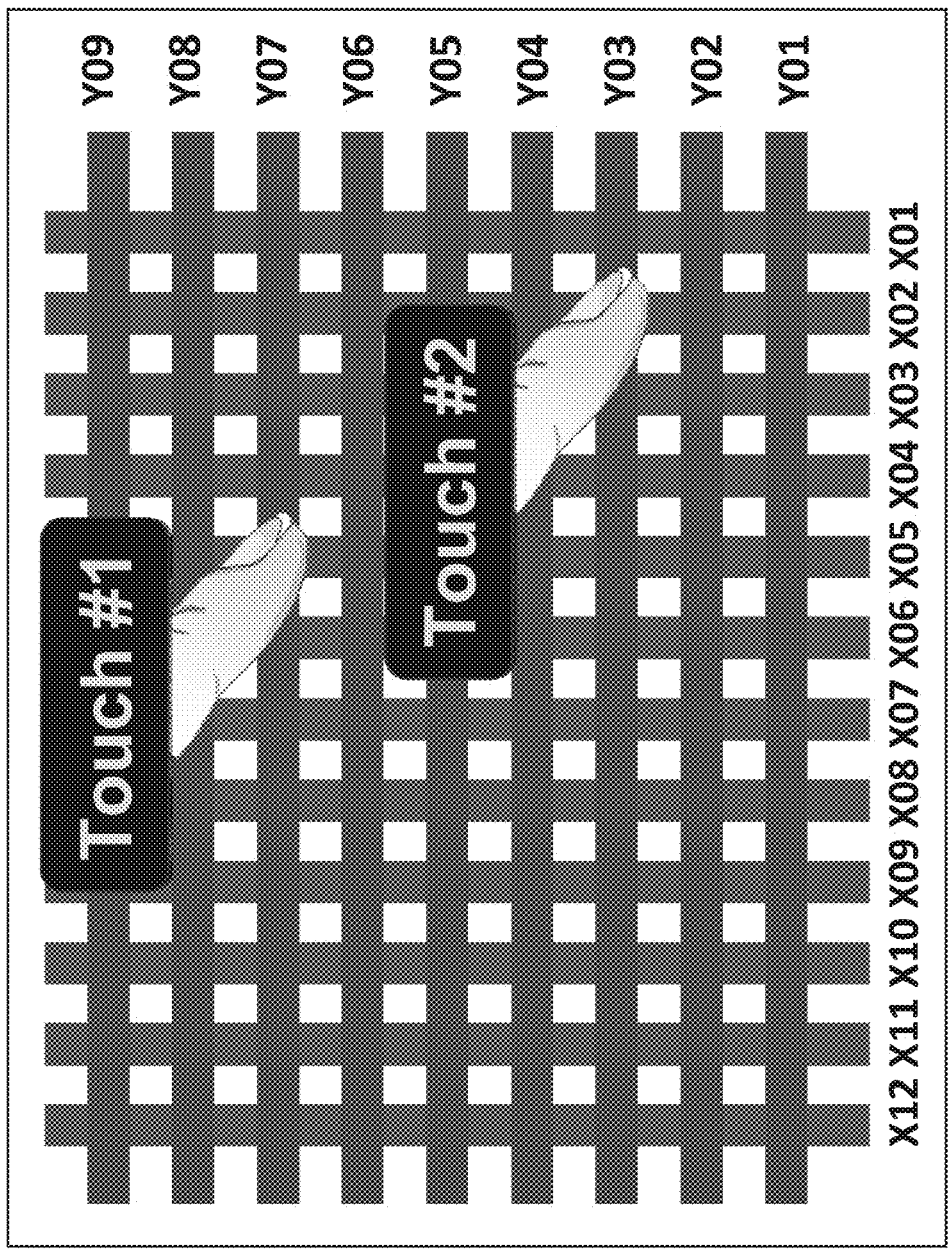
FIGS. 5 to 9 illustrate schematic plan views of self and mutual capacitive touch detection of two touches to a touch sensor, according to the teachings of this disclosure.
Figure 6:
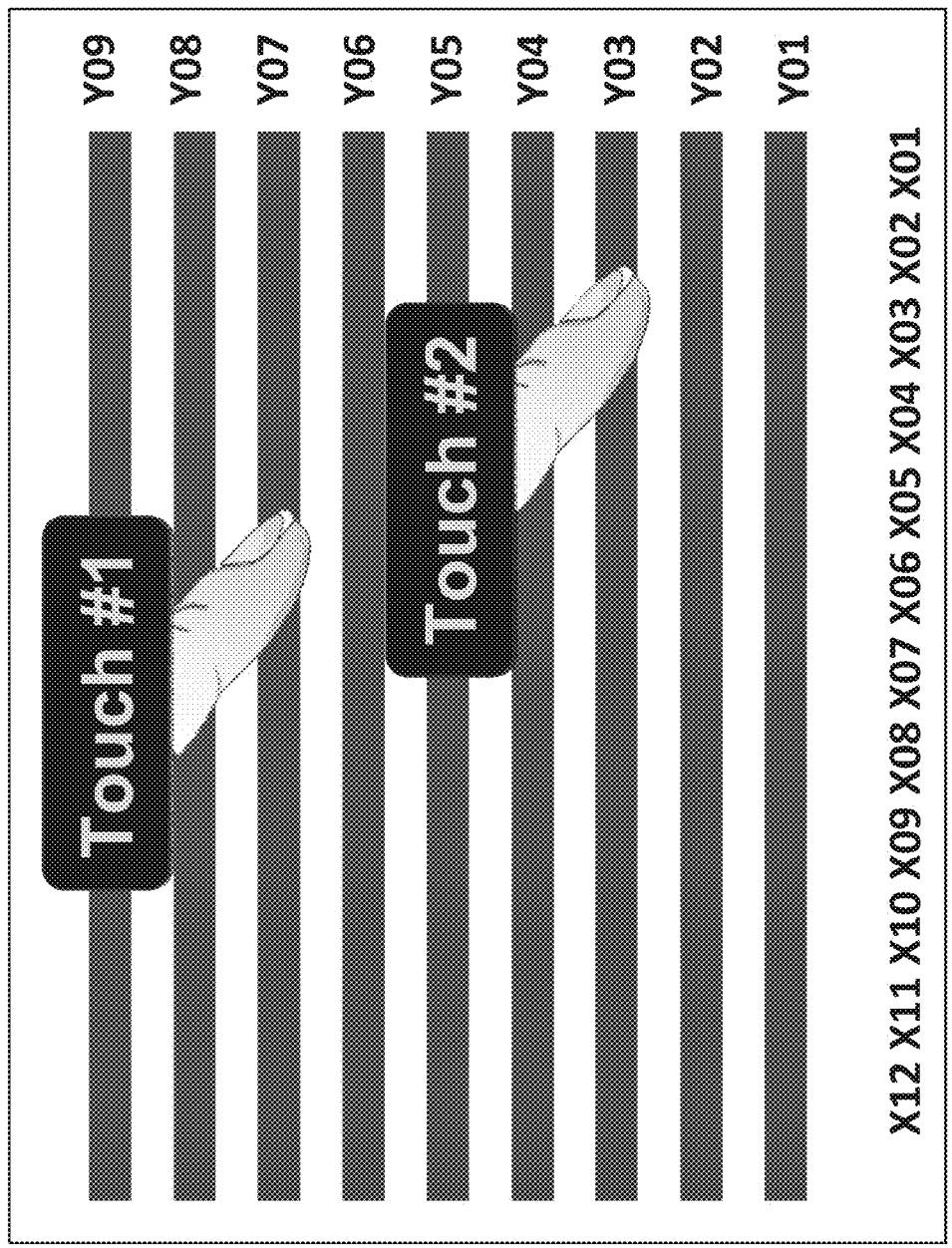

Referring to FIGS. 5 to 9, depicted are schematic plan views of self and mutual capacitive touch detection of two touches to a touch sensor, according to the teachings of this disclosure. In FIG. 5 two touches, represented by a picture of parts of two fingers, are at approximately the coordinates of X05, Y07 for touch #1 and X02, Y03 for touch #2. During self capacitive touch detection each one of the rows Y01 to Y09 may be measured to the determine the capacitance values thereof. Note that baseline capacitance values with no touches thereto for each one of the rows Y01 to Y09 have been taken and stored in a memory (e.g., memory 106—FIG. 1). Any significant capacitance changes to the baseline capacitance values of the rows Y01 to Y09 will be obvious and taken as finger touches. In the example shown in FIG. 6 the first finger is touching row Y07 and the second finger is touching row Y03, wherein the capacitance values of those two rows will change, indicating touches thereto. However it is still unknown from the self capacitance measurements where on these two row that the touches have occurred.

Figure 7:
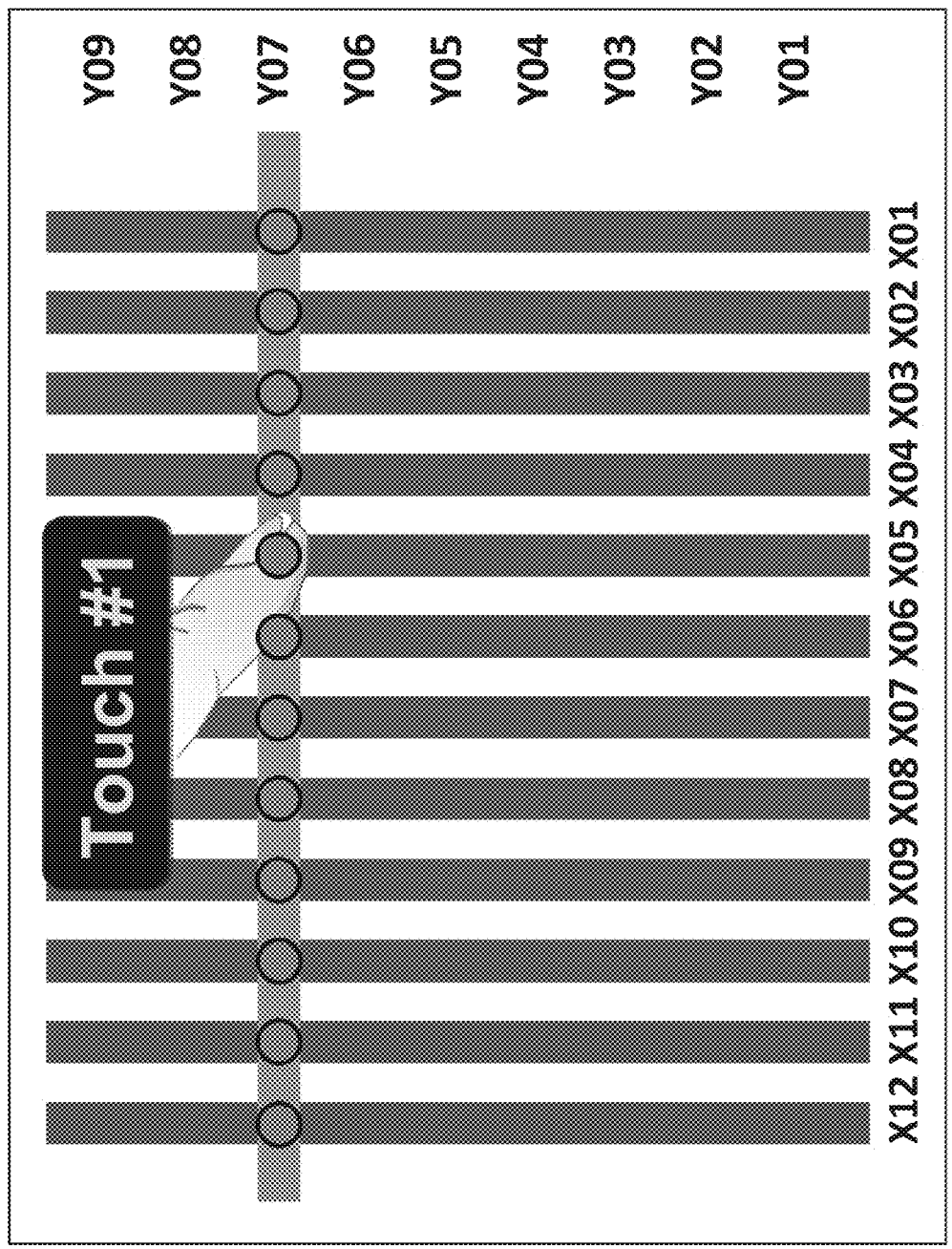
Figure 8:
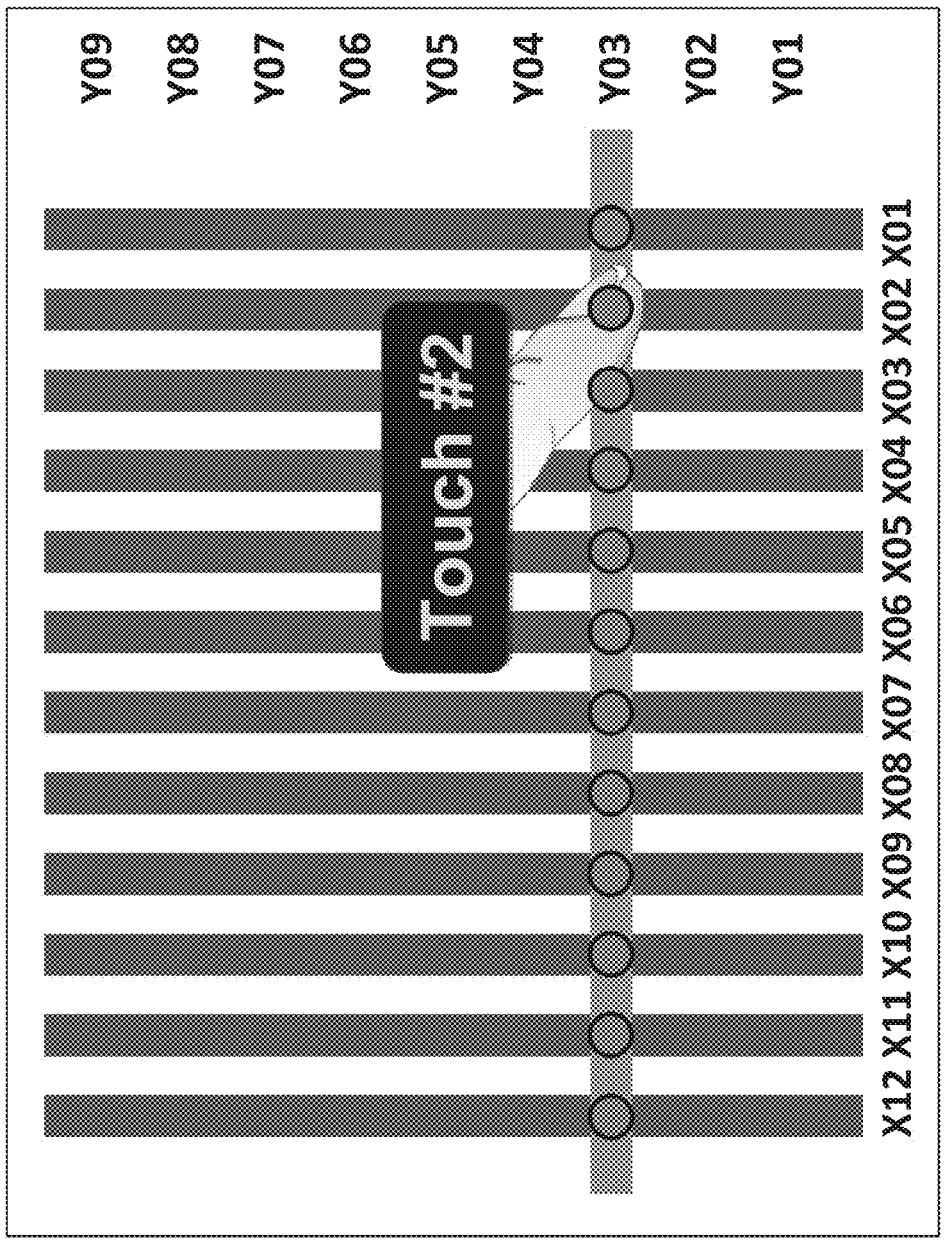
Figure 9:
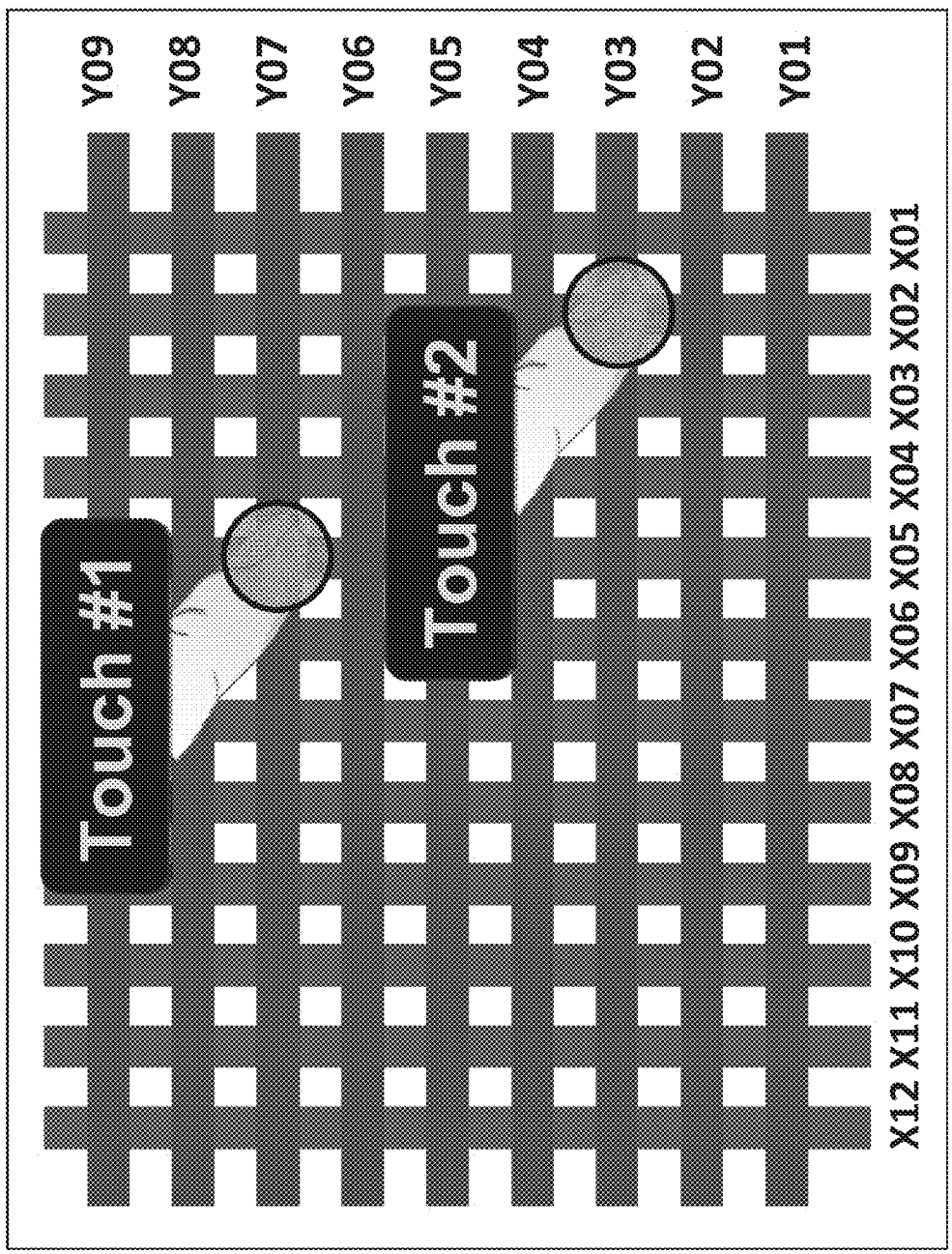

Once the touched rows (Y07 and Y03) have been determined using the self capacitance changes thereof, mutual capacitive detection may be used in determining where on these two touched rows (Y07 and Y03) the touches have occurred. Referring to FIG. 7, this may be accomplished by exciting, e.g., putting a voltage pulse on, each of the columns X01 to X12 one at a time while measuring the capacitance value of row Y07 when each of the columns X01 to X12 is individually excited. The column (X05) excitation that causes the largest change in the capacitance value of row Y07 will be the location on that row that corresponds to the intersection of column X05 with row Y07. Referring to FIG. 8, likewise measuring the capacitance value of row Y03 when each of the columns X01 to X12 is individually excited determines where on column Y03 the touch #2 has occurred. Referring to FIG. 9, the two touches are at points or nodes (X05, Y07) and (X02, Y03). It is contemplated and within the scope of this disclosure that if the capacitances of more then one of the selected rows, e.g., Y07 and Y03, can be measured simultaneously, then only one set of individual column X01 to X12 excitations is needed in determining the two touches to the touch sensor 102.

Multi-touch detection and gesturing using projected capacitance (PCAP) touch systems are more fully described in commonly owned United States Patent Application Publication No. US 2012/0113047, entitled "Capacitive Touch System Using Both Self and Mutual Capacitance" by Jerry Hanauer; and U.S. patent application Ser. No. 13/830,891; filed Mar. 14, 2013; entitled "Method And System For Multi-Touch Decoding," by Lance Lamont and Jerry Hanauer; wherein both are hereby incorporated by reference herein for all purposes.

Figure 10:
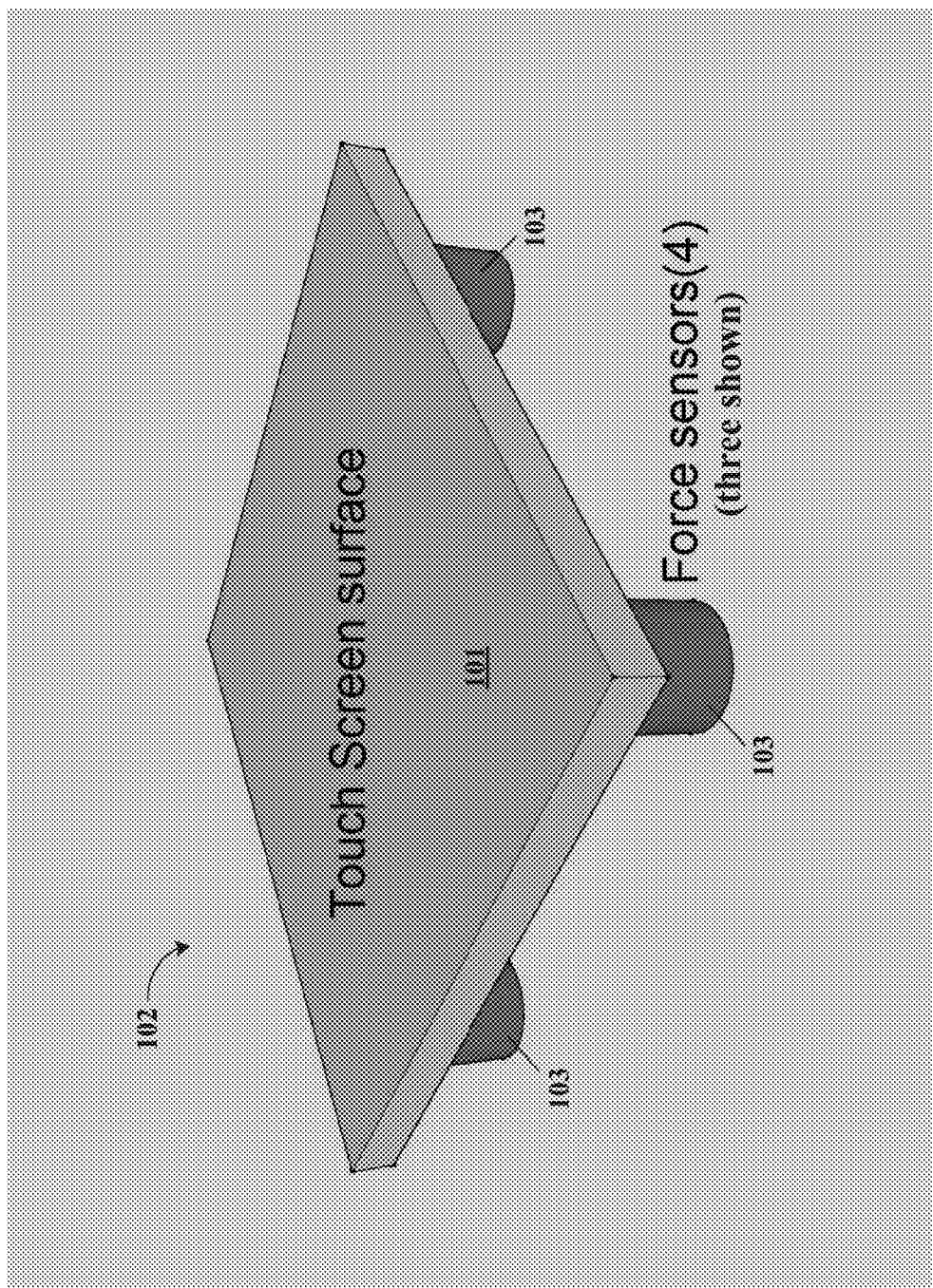
FIG. 10 illustrates a schematic perspective view of a touch sensor capable of detecting both locations of touches thereto and forces of those touches on the surface of the touch sensor, according to an embodiment of this disclosure.
Figure 11:
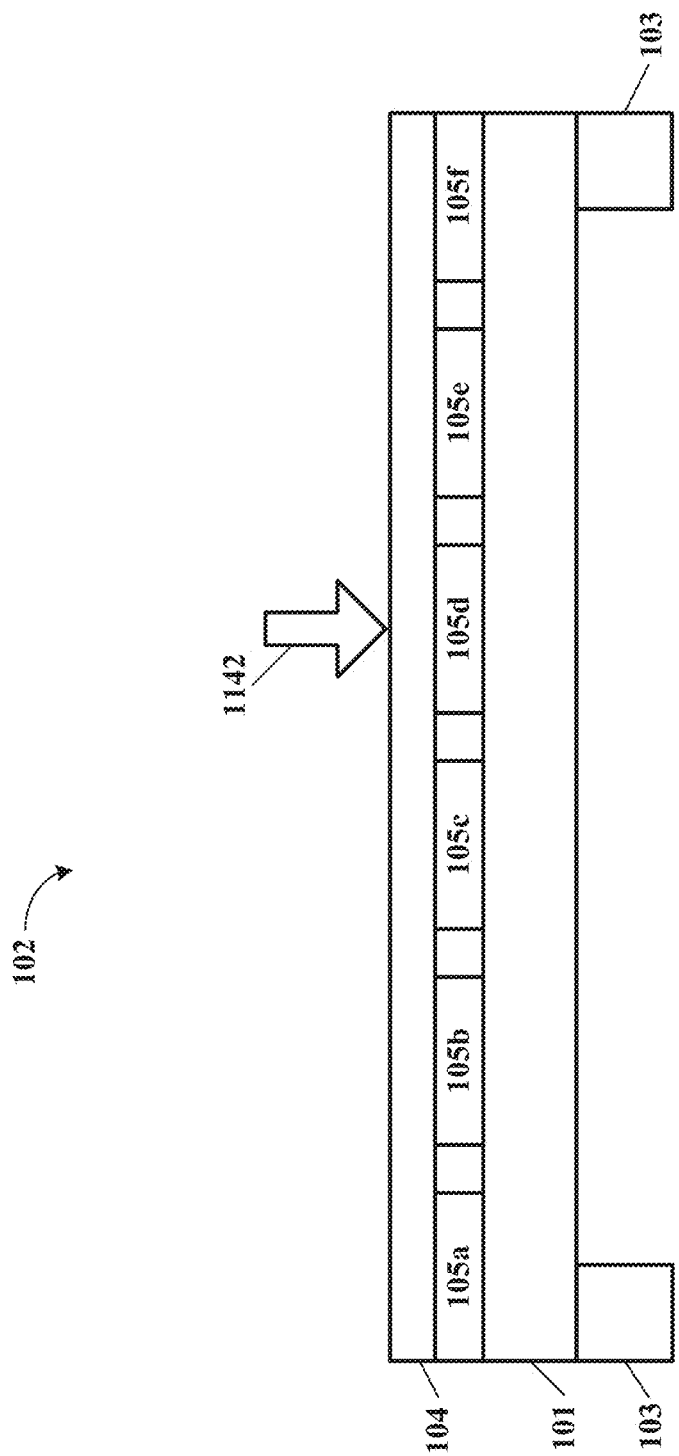
FIG. 11 illustrates a schematic elevational view of a touch sensor capable of detecting both locations of touches thereto and forces of those touches on the surface of the touch sensor, according to an embodiment of this disclosure.

Referring to FIGS. 10 and 11, depicted are schematic perspective and elevational views, respectively, of a touch sensor capable of detecting both locations of touches thereto and forces of those touches on the surface of the touch sensor, according to an embodiment of this disclosure. A touch sensor capable of detecting both a location of a touch(es) thereto and a force(s) of that touch(es) thereto, generally represented by the numeral 102, may comprise a plurality of conductive rows 105 and columns 104 on a substrate 101, and force sensors 103, one force sensor 103 located at each corner of the substrate 101. The conductive columns 104 and the conductive rows 105 are used in determining a location(s) of a touch(es), as more fully described hereinabove, and the force sensors 103 are used to detect the amount of force 1142 being applied to the substrate 101. The substrate 101 may be clear, translucent or opaque, or any combination thereof. A visual displace may be included in or project through the substrate 101 for supplying information and images to a user, and may provide visual feedback during touch and/or gesturing operations of the touch sensor 102. It is contemplated and within the scope of this disclosure that more or fewer than four force sensors 103 may be used, according to the teachings of this disclosure, with any geometric shape of the substrate 101 appropriate for the application of use.

Referring back to FIG. 1, microcontrollers 112 now include peripherals that enhance the detection and evaluation of such capacitive value changes. More detailed descriptions of various capacitive touch system applications are more fully disclosed in Microchip Technology Incorporated application notes AN1298, AN1325 and AN1334, available at www.microchip.com, and all are hereby incorporated by reference herein for all purposes. One such application utilizes the capacitive voltage divider (CVD) method to determine a capacitance value and/or evaluate whether the capacitive value has changed. The CVD method is more fully described in Application Note AN1208, available at www.microchip.com; and a more detailed explanation of the CVD method is presented in commonly owned United States Patent Application Publication No. US 2010/0181180, entitled "Capacitive Touch Sensing using an Internal Capacitor of an Analog-To-Digital Converter (ADC) and a Voltage Reference," by Dieter Peter; wherein both are hereby incorporated by reference herein for all purposes.

A Charge Time Measurement Unit (CTMU) may be used for very accurate capacitance measurements. The CTMU is more fully described in Microchip application notes AN1250 and AN1375, available at www.microchip.com, and commonly owned U.S. Pat. No. 7,460,441 B2, entitled "Measuring a long time period;" and U.S. Pat. No. 7,764,213 B2, entitled "Current-time digital-to-analog converter," both by James E. Bartling; wherein all of which are hereby incorporated by reference herein for all purposes.

It is contemplated and within the scope of this disclosure that any type of capacitance measurement circuit having the necessary resolution may be used in determining the capacitance values of the plurality of conductive columns 104 and/or rows 105, and that a person having ordinary skill in the art of electronics and having the benefit of this disclosure could implement such a capacitance measurement circuit.

Figure 12:
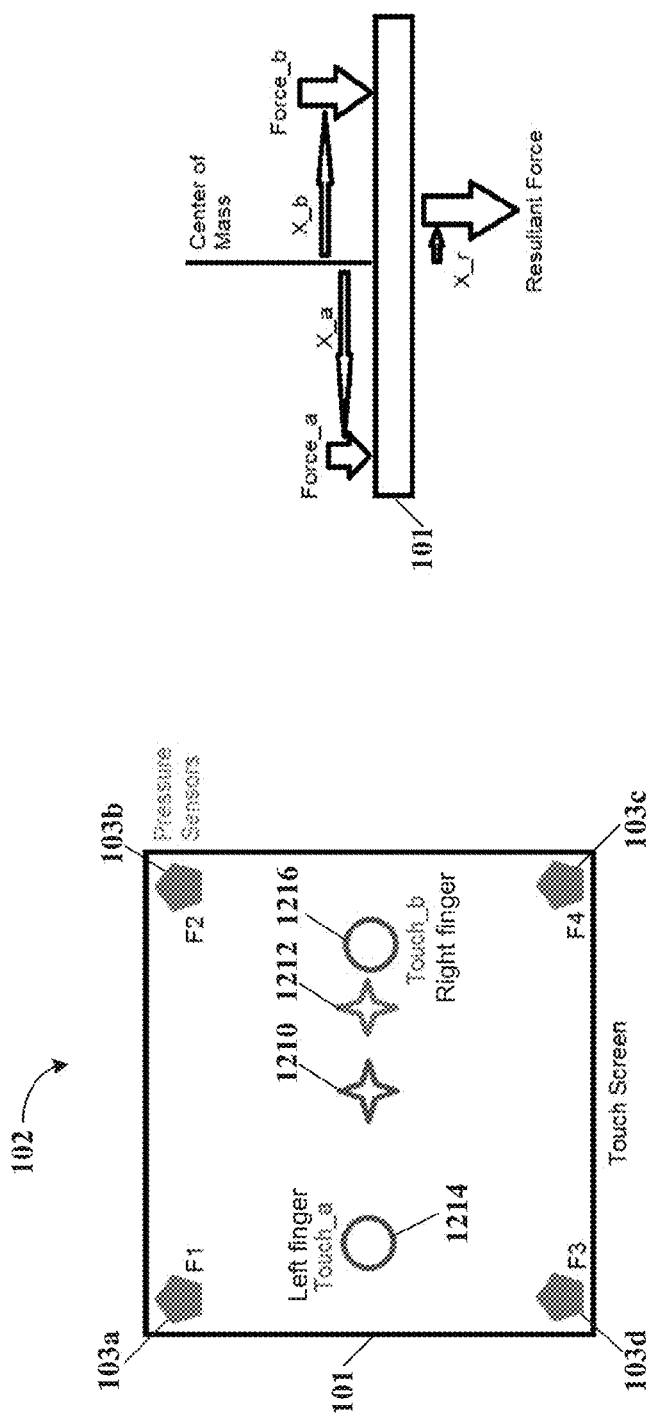
FIG. 12 illustrates schematic plan and elevational views of a touch sensor showing two simultaneous touch points, the resulting geometric center thereof and the resulting force to the touch sensor face, according to the teachings of this disclosure.

Referring to FIG. 12, depicted are schematic plan and elevational views of a touch sensor showing two simultaneous touch points, the resulting geometric center thereof and the resulting force to the touch sensor face, according to the teachings of this disclosure. Four force sensors 103a-103d, one located at each corner of the substrate 101, provide total and proportional force on the touch sensor substrate 101. A touch force bias is defined as the offset between the geometric center of a cluster of touches (touch points) and the resultant force (calculated force point) generated by the individual finger pressure levels, as well as, the magnitude of the force. For example, shown in FIG. 12 are two finger touches in which a left finger pressure (touch point 1214) is less than a right finger pressure (touch point 1216). The geometric center between these two finger touches may be represented by a center of mass (CM) 1210 located between the two touch points 1214 and 1216.

The four sensors 103a-103d may be used to determine the resultant force, e.g., calculated force point (CFP) 1212 resulting from the two touches at the touch points 1214 and 1216. The resultant force (CFP 1212) may be determined with a two dimensional calculation using the pressure (force) at each of the sensors 103. The forces on the four sensors 103 provide the total force generated by the user's finger pressure(s) at all touch locations. The location is determined by, for example but is not limited to, an X and Y resultant force calculation. To calculate the resultant force (CFP 1212), the X and Y coordinate system may be superimposed on the touch sensor with zero at the center of mass for the screen. The resulting force vectors may then be used in the following equations.

The total resulting force, $F_R$, (CFP 1212) may be calculated as follows:

$$F_R = F1 + F2 + F3 + F4 \qquad (Eq.\ 1).$$

Where F1, F2, F3, and F4 are the forces measured by each of the respective sensors 103.

The X-offset, $X_R$, of the total resulting force, $F_R$, (CFP 1212) may be calculated as follows:

$$F_R * X_R = ((F1+F3)*(-W/2)) + ((F2+F4)*(W/2)) \qquad (Eq.\ 2).$$

Where W is the width of the face of the touch sensor 102 and $X_R$ is the X offset from the center of mass (CM 1210) to the resultant force (CFP 1212).

The Y-offset, $Y_R$, of the total resulting force, $F_R$, (CFP 1212) may be calculated as follows:

$$F_R * Y_R = ((F1+F2)*(-H/2)) + ((F3+F4)*(H/2)) \qquad (Eq.\ 3).$$

Where H is the height of the face of the touch sensor 102 and $Y_R$ is the Y offset from the center of mass (CM 1210) to the resultant force (CFP 1212).

The geometric center may then be calculated by using the same X-Y coordinate system. When comparing the location of the resulting force versus the geometric center, two bias solutions may result:
1. The resulting force and the geometric center match and the press may be a vertical movement. A push down may be used for searching through a multi-page document, inserting a page, or fixing an object in place.
2. The resulting force is offset from the geometric center and the press is a rotational movement about an axis perpendicular to the line between the resulting force and the geometric center. The degree of rotation may be determined by the magnitude of the resulting force. This works for rotating objects in various axes.

These bias solutions may then be combined with the history of the current press (increasing pressure over time, or movement of the touch) to determine which, of several possible, gestures is being generated. Other bias solutions are possible and contemplated herein.

Figure 13:
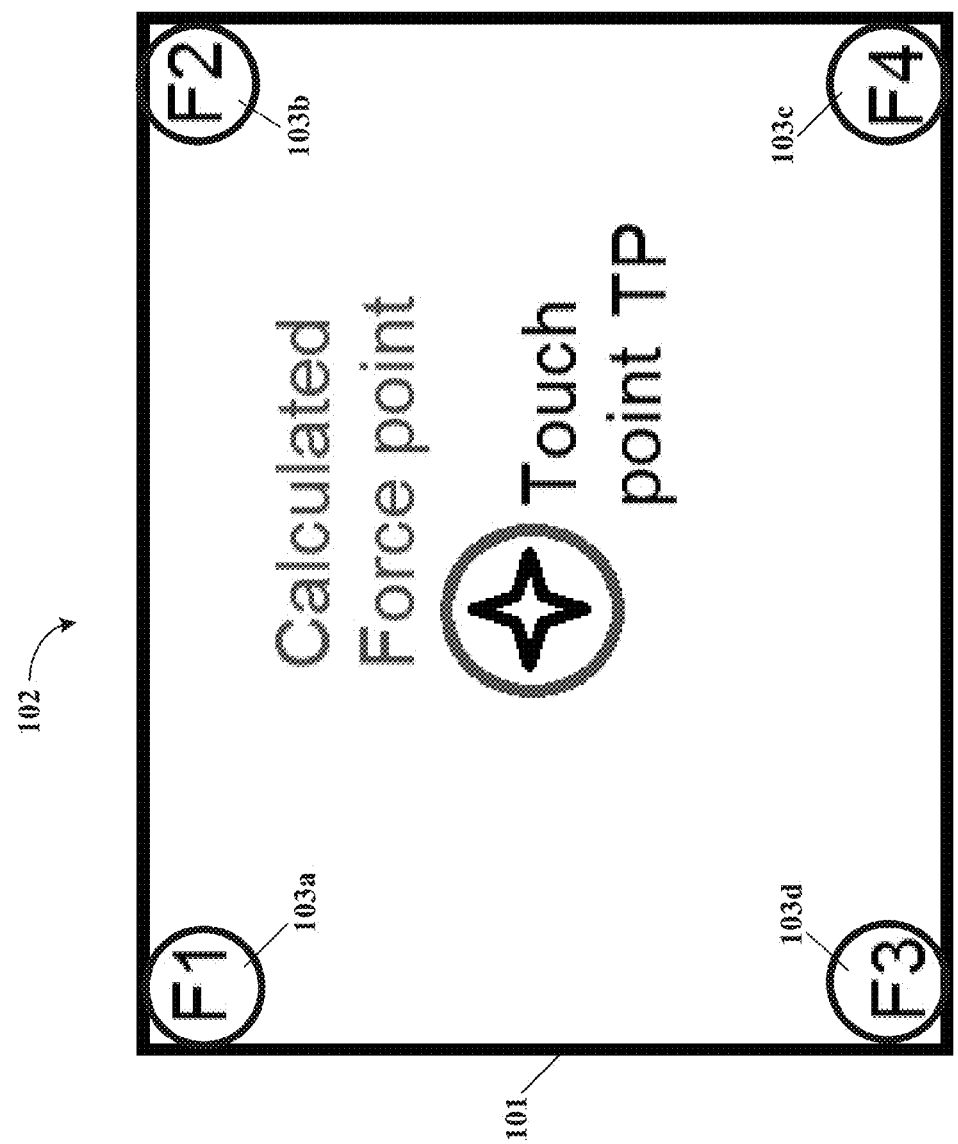
FIG. 13 illustrates a schematic plan view of a touch sensor face showing a single touch point and a resulting force to the touch sensor face, according to the teachings of this disclosure.

Referring to FIG. 13, depicted is a schematic plan view of a touch sensor face showing a single touch point and a resulting force to the touch sensor face, according to the teachings of this disclosure. Four force sensors 103 are located at the corners of a touch sensor substrate 101. The force sensors 103 provide total and proportional force on the touch sensor substrate 101. The force information from the touch sensors 103 and the previously determined touch point (TP) on the touch sensor are used to determine a calculated force point (CFP).

Figure 14:
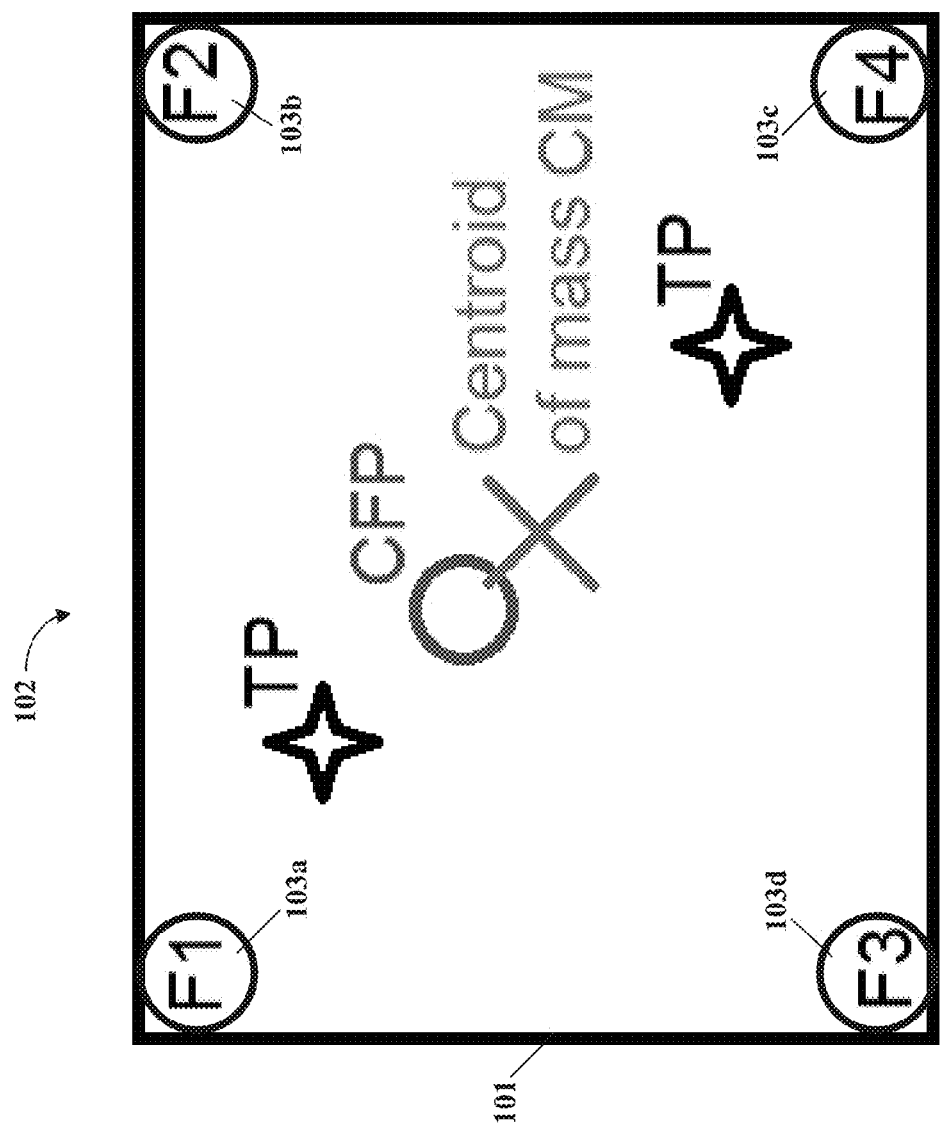
FIG. 14 illustrates a schematic plan view of a touch sensor face showing two simultaneous touch points and a resulting combined force to the touch sensor face, according to the teachings of this disclosure.

Referring to FIG. 14, depicted is a schematic plan view of a touch sensor face showing two simultaneous touch points and a resulting combined force to the touch sensor face, according to the teachings of this disclosure. Four force sensors 103 are located at the corners of a touch sensor substrate 101. The force sensors 103 provide total and proportional force on the touch sensor substrate 101. The force information from the touch sensors 103 and the previously determined touch points (TP) on the touch sensor are used to determine a center of mass (CM) and a calculated force point (CFP).

Figure 15:
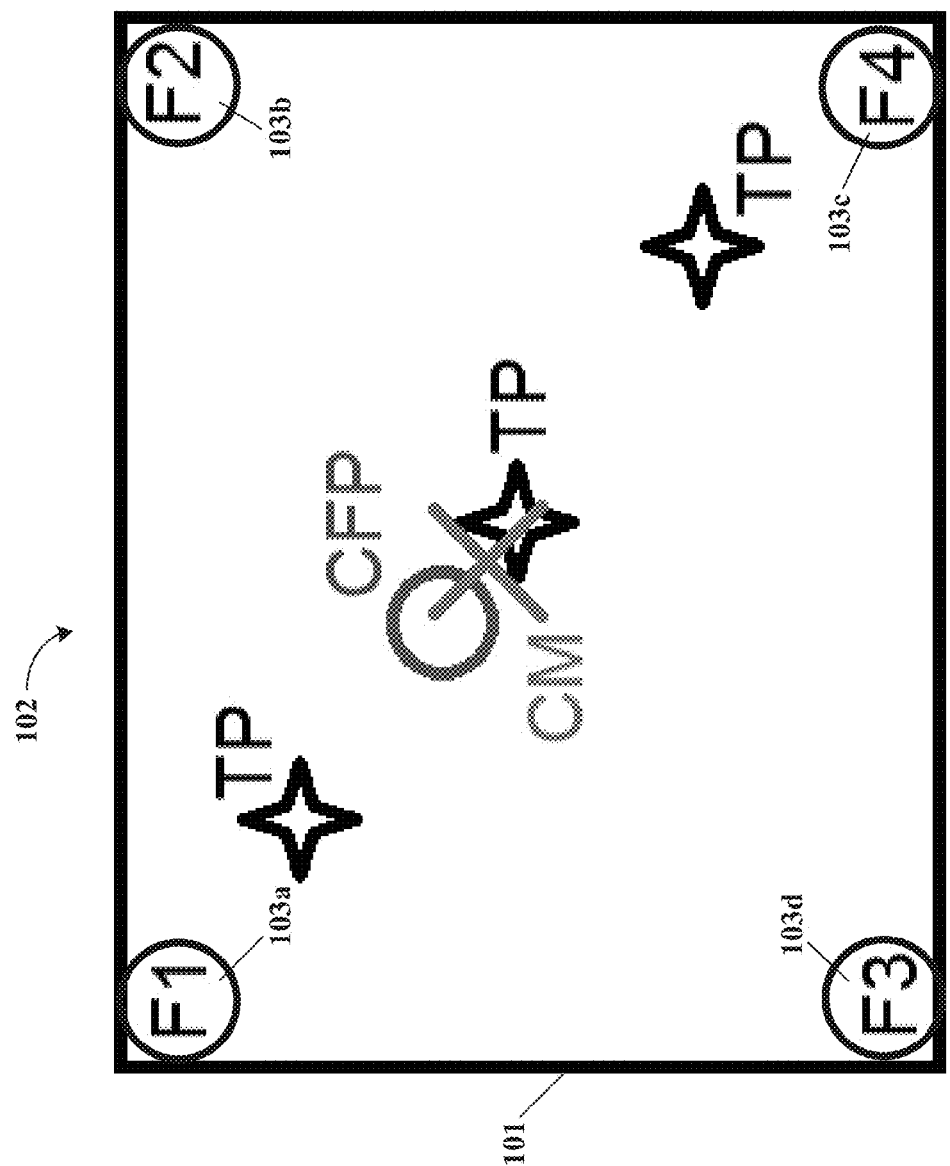
FIG. 15 illustrates a schematic plan view of a touch sensor face showing three simultaneous touch points and a resulting combined force to the touch sensor face, according to the teachings of this disclosure.

Referring to FIG. 15, depicted is a schematic plan view of a touch sensor face showing three simultaneous touch points and a resulting combined force to the touch sensor face, according to the teachings of this disclosure. Four force sensors 103 are located at the corners of a touch sensor substrate 101. The force sensors 103 provide total and proportional force on the touch sensor substrate 101. The force information from the touch sensors 103 and the previously determined touch points (TP) on the touch sensor are used to determine a center of mass (CM) and a calculated force point (CFP).

Figure 16:
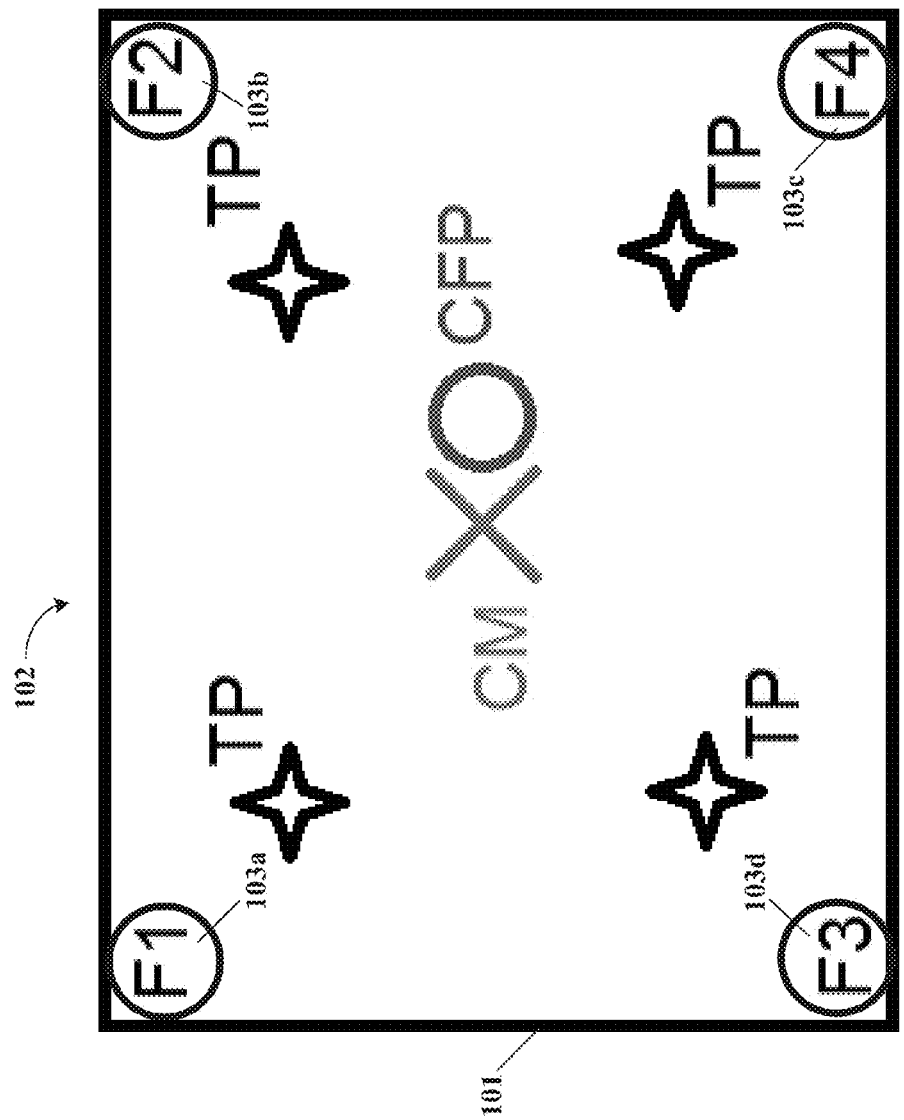
FIG. 16 illustrates a schematic plan view of a touch sensor face showing four simultaneous touch points and a resulting combined force to the touch sensor face, according to the teachings of this disclosure.

Referring to FIG. 16, depicted is a schematic plan view of a touch sensor face showing four simultaneous touch points and a resulting combined force to the touch sensor face, according to the teachings of this disclosure. Four force sensors 103 are located at the corners of a touch sensor substrate 101. The force sensors 103 provide total and proportional force on the touch sensor substrate 101. The force information from the touch sensors 103 and the previously determined touch points (TP) on the touch sensor are used to determine a center of mass (CM) and a calculated force point (CFP).

It is contemplated and within the scope of this disclosure that more than four touch locations may be detected, and the CFP and CM thereof determined using more or fewer than four force sensors 103. In addition the force sensor substrate 101 may be any appropriate geometric shape for the application of use.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus for determining a location of a touch thereto and a force thereof on a touch sensing surface, comprising:
   a first plurality of electrodes arranged in a parallel orientation having a first axis, wherein each of the first plurality of electrodes comprises a self capacitance;
   a second plurality of electrodes arranged in a parallel orientation having a second axis perpendicular to the first axis, the first plurality of electrodes are located over the second plurality of electrodes and form a plurality of nodes comprising overlapping intersections of the first and second plurality of electrodes, wherein each of the plurality of nodes comprises a mutual capacitance;
   a substrate having the first and second plurality of electrodes disposed thereon, wherein the substrate has a plurality of corners;
   a plurality of pressure sensors arranged below the substrate and at each corner of the substrate, wherein each pressure sensor receives pressure caused by a touch from a bottom surface of the substrate;
   whereby each of the plurality of pressure sensors measures a portion of a force applied to the substrate during a touch thereto, and
   a processing system configured to calculate force point (CFP) and a geometric center of mass (CM) from the pressure values measured by the plurality of pressure sensors, wherein the processing device is further configured to determine a vertical movement of the touches when the CFP matches the CM and to determine a rotational movement when the CFP does not match the CM, and to generate gesture commands corresponding to the vertical movement or the rotational movement with regard to a displayed object that corresponds to the touches.

2. The apparatus according to claim 1, wherein the substrate is light transmissive and the first and second plurality of electrodes comprise Indium Tin Oxide (ITO).

3. The apparatus according to claim 1, wherein the substrate is light transmissive and the first and second plurality of electrodes comprise Antimony Tin Oxide (ATO).

4. The apparatus according to claim 1, wherein the substrate comprises four corners.

5. The apparatus according to claim 1, wherein the processing system comprises a microcontroller comprising a digital processor and memory.

6. The apparatus according to claim 5, wherein the microcontroller further comprises a capacitive touch analog front end.

7. The apparatus according to claim 6, wherein the microcontroller further comprises an analog-to-digital converter (ADC) controller.

8. A method for determining a location of a touch thereto and a force thereof on a touch sensing surface, said method comprising the steps of:
   providing a first plurality of electrodes arranged in a parallel orientation having a first axis, wherein each of the first plurality of electrodes comprises a self capacitance;
   providing a second plurality of electrodes arranged in a parallel orientation having a second axis perpendicular to the first axis, the first plurality of electrodes are located over the second plurality of electrodes and form a plurality of nodes comprising overlapping intersections of the first and second plurality of electrodes, wherein each of the plurality of nodes comprises a mutual capacitance;
   providing a substrate having the first and second plurality of electrodes disposed thereon, wherein the substrate has a plurality of corners;
   providing a plurality of pressure sensors arranged below the substrate and at each corner of the substrate, wherein each pressure sensor receives pressure caused by a touch from a bottom surface of the substrate;
   scanning the first plurality of electrodes for determining values of the self capacitances thereof;
   comparing the values of the scanned self capacitances to determine which one of the first plurality of electrodes has the largest value of self capacitance;
   scanning the nodes of the one of the first plurality of electrodes having the largest value of self capacitance for determining values of the mutual capacitances of the respective plurality of nodes;
   comparing the values of the scanned mutual capacitances of the respective plurality of nodes on the first electrode having the largest value of self capacitance, wherein the node having the largest value of mutual capacitance is a location of a touch on the touch sensing surface; and
determining a force of the touch on the touch sensing surface from pressure values measured by the plurality of pressure sensors by determining a calculated force point (CFP) and a geometric center of mass (CM) from the pressure values, wherein when the CFP matches the CM a vertical movement of the touches is determined and wherein when the CFP does not match the CM a rotational movement of the touches is determined, and wherein gesture commands corresponding to the vertical movement or the rotational movement are performed with regard to a displayed object that corresponds to the touches.

9. The method as recited in claim 8, wherein the self and mutual capacitance values are measured with an analog front end and an analog-to-digital converter (ADC).

10. The method as recited in claim 9, wherein the self and mutual capacitance values are stored in a memory of a digital device.

11. The method as recited in claim 10, wherein a digital processor in the digital device uses the stored self and mutual capacitance values in determining the touch location of the touch and the force applied by the touch to the touch sensing surface at the touch location.

12. The method as recited in claim 8, wherein the step of determining a force of the touch on the touch sensing surface comprises the step of determining a calculated force point (CFP) by adding together the pressure values measured by the plurality of pressure sensors.

13. A method for determining locations of a plurality of touches thereto and a combined force thereof on a touch sensing surface, said method comprising the steps of:
    providing a first plurality of electrodes arranged in a parallel orientation having a first axis, wherein each of the first plurality of electrodes comprises a self capacitance;
    providing a second plurality of electrodes arranged in a parallel orientation having a second axis perpendicular to the first axis, the first plurality of electrodes are located over the second plurality of electrodes and form a plurality of nodes comprising overlapping intersections of the first and second plurality of electrodes, wherein each of the plurality of nodes comprises a mutual capacitance;
    providing a substrate having the first and second plurality of electrodes disposed thereon, wherein the substrate has a plurality of corners;
    providing only four pressure sensors arranged below the first and second plurality of electrodes under the substrate and one of the four pressure sensors at each corner of the substrate, wherein each pressure sensor receives pressure caused by a touch from a bottom surface of the substrate;
    scanning the first plurality of electrodes for determining values of the self capacitances thereof;
    comparing the values of the scanned self capacitances to determine which ones of the first plurality of electrodes have the largest values of self capacitance;
    scanning the nodes of the ones of the first plurality of electrodes having the largest values of self capacitance for determining values of the mutual capacitances of the respective plurality of nodes;
    comparing the values of the scanned mutual capacitances of the respective plurality of nodes on the first electrodes having the largest values of self capacitance, wherein the nodes having the largest values of mutual capacitance are locations of touches on the touch sensing surface; and
    determining from pressure values measured by the plurality of pressure sensors:
        a calculated force point (CFP); and
        a geometric center of mass (CM);
        comparing the calculated force point with the center of mass to determine an action to be performed, wherein when the CFP matches the CM a vertical movement of the touches is determined and wherein when the CFP does not match the CM a rotational movement of the touches is determined, and wherein gesture commands corresponding to the vertical movement or the rotational movement are performed with regard to a displayed object that corresponds to the touches.

14. The method as recited in claim 13, wherein the self and mutual capacitance values are measured with an analog front end and an analog-to-digital converter (ADC).

15. The method as recited in claim 14, wherein the self and mutual capacitance values are stored in a memory of a digital device.

16. The method as recited in claim 15, wherein a digital processor in the digital device uses the stored self and mutual capacitance values in determining the touch locations of the touches and the respective forces applied by the touches to the touch sensing surface at the touch locations.

17. The method as recited in claim 13, comprising the steps of:
    determining the calculated force point (CFP) by adding together the pressure values measured by the plurality of pressure sensors; and
    determining the center of mass (CM) by using the touch locations and the pressure values measured by the plurality of pressure sensors.

18. The method as recited in claim 17, further comprising the steps of:
    determining an X-offset, XR, of the CFP with respect to the geometric CM; and
    determining a Y-offset, YR, of the CFP with respect to the geometric CM.

19. The method as recited in claim 18, wherein the step of determining the X offset, XR, comprises the step of solving $XR=(((F1+F3)*(-W/2))+((F2+F4)*(W/2))/FR$, wherein W is a width of a face of the touch sensing surface, and XR is an X offset from the CM to the CFP.

20. The method as recited in claim 18, wherein the step of determining the Y offset, YR, comprises the step of solving $YR=(((F1+F2)*(-H/2))+((F3+F4)*(H/2))/FR$, wherein H is a height of a face of the touch sensing surface, and YR is a Y offset from the CM to the CFP.

21. A system for determining locations of touches thereto and a combined force thereof on a touch sensing surface, said system comprising:
    a first plurality of electrodes arranged in a parallel orientation having a first axis, wherein each of the first plurality of electrodes comprises a self capacitance;
    a second plurality of electrodes arranged in a parallel orientation having a second axis perpendicular to the first axis, the first plurality of electrodes are located over the second plurality of electrodes and form a plurality of nodes comprising overlapping intersections of the first and second plurality of electrodes, wherein each of the plurality of nodes comprises a mutual capacitance;

a substrate having the first and second plurality of electrodes disposed thereon, wherein the substrate has a plurality of corners;

four pressure sensors arranged below the first and second plurality of electrodes and under the substrate, wherein one of the four pressure sensors is arranged at each corner of the substrate, wherein each pressure sensor receives pressure caused by a touch from a bottom surface of the substrate;

a digital processor and memory, wherein digital outputs of the digital processor are coupled to the first and second plurality of electrodes;

an analog front end coupled to the first and second plurality of electrodes and the plurality of pressure sensors;

an analog-to-digital converter (ADC) having at least one digital output coupled to the digital processor;

wherein the analog front end, ADC, and processor are configured:

to measure values of the self capacitances for each of the first plurality of electrodes, to store the values of the measured self capacitances in the memory;

to measure values of the mutual capacitances of the nodes of at least one of the first electrodes having at least one of the largest values of self capacitance, to store the values of the measured mutual capacitances in the memory;

to measure and store values of pressures by the plurality of pressure sensors in the memory;

to use the stored self and mutual capacitance values for determining locations of the touches, and to calculate a force point (CFP) and a center of mass (CM) on the touch sensing surface from the pressure values measured by the plurality of pressure sensors and to compare the calculated force point and the geometric center of mass to determine an action to be performed, wherein when the CFP matches the CM a vertical movement of the touches is determined and wherein when the CFP does not match the CM a rotational movement of the touches is determined, and wherein gesture commands corresponding to the vertical movement or the rotational movement are performed with regard to a displayed object that corresponds to the touches.

22. The system as recited in claim 21, wherein the digital processor, memory, analog front end and ADC are provided by a digital device.

23. The system as recited in claim 21, wherein the digital processor, memory, analog front end and ADC are provided by at least one digital device.

24. The system as recited in claim 22, wherein the digital device comprises a microcontroller.

25. The system as recited in claim 22, wherein the digital device is selected from the group consisting of a microprocessor, a digital signal processor, an application specific integrated circuit (ASIC) and a programmable logic array (PLA).

26. The system as recited in claim 21, wherein the substrate is light transmissive and the first and second plurality of electrodes comprise Indium Tin Oxide (ITO).

27. The system as recited in claim 21, wherein the substrate is light transmissive and the first and second plurality of electrodes comprise Antimony Tin Oxide (ATO).

28. The system according to claim 21, wherein the substrate comprises four corners.

* * * * *